(12) United States Patent
Huang et al.

(10) Patent No.: US 11,460,750 B2
(45) Date of Patent: Oct. 4, 2022

(54) OPTICAL MODULATOR AND CONTROL METHOD OF OPTICAL MODULATOR

(71) Applicant: FUJITSU LIMITED, Kawasaki (JP)

(72) Inventors: Guoxiu Huang, Kawasaki (JP); Hisao Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 6 days.

(21) Appl. No.: 17/118,191

(22) Filed: Dec. 10, 2020

(65) Prior Publication Data

US 2021/0223658 A1 Jul. 22, 2021

(30) Foreign Application Priority Data

Jan. 20, 2020 (JP) .............................. JP2020-006613

(51) Int. Cl.
*G02F 1/21* (2006.01)
*G02F 1/225* (2006.01)
*G02F 1/01* (2006.01)

(52) U.S. Cl.
CPC ............ *G02F 1/212* (2021.01); *G02F 1/0123* (2013.01); *G02F 1/2255* (2013.01)

(58) Field of Classification Search
CPC ....... G02F 1/0123; G02F 1/212; G02F 1/2255
USPC ........................................................ 385/1–3
See application file for complete search history.

(56) References Cited

U.S. PATENT DOCUMENTS

| 10,313,015 B2* | 6/2019 | Kawakami ....... H04B 10/50575 |
| 2015/0222365 A1 | 8/2015 | Goebuchi |
| 2017/0187465 A1 | 6/2017 | Kaneoka et al. |
| 2017/0293165 A1 | 10/2017 | Kaneoka et al. |
| 2018/0074348 A1* | 3/2018 | Fujita ................. H04B 10/5561 |
| 2018/0323878 A1 | 11/2018 | Kawakami et al. |
| 2019/0115980 A1 | 4/2019 | Ikeda |

FOREIGN PATENT DOCUMENTS

| JP | 2017-116746 A | 6/2017 |
| JP | 2017-188829 A | 10/2017 |
| JP | 2019-074612 A | 5/2019 |
| WO | 2014/034047 A1 | 3/2014 |
| WO | 2017/082349 A1 | 5/2017 |

* cited by examiner

*Primary Examiner* — Michael P Mooney
(74) *Attorney, Agent, or Firm* — Fujitsu Patent Center

(57) ABSTRACT

An optical modulator includes: a Mach-Zehnder modulator; and a processor that controls a bias of the Mach-Zehnder modulator. The Mach-Zehnder modulator includes first and second Mach-Zehnder interferometers that are respectively formed on first and second optical paths, a phase shifter that adjusts a phase difference between the first optical path and the second optical path. The processor outputs a first bias signal for controlling an operation point of the first Mach-Zehnder interferometer, a second bias signal for controlling an operation point of the second Mach-Zehnder interferometer, and a third bias signal for controlling a phase-shift amount of the phase shifter, a low-frequency signal being superimposed on the third bias signal. The processor controls the first through third bias signals based on a frequency component of the low-frequency signal that is included in the optical signal output from the Mach-Zehnder modulator.

7 Claims, 18 Drawing Sheets

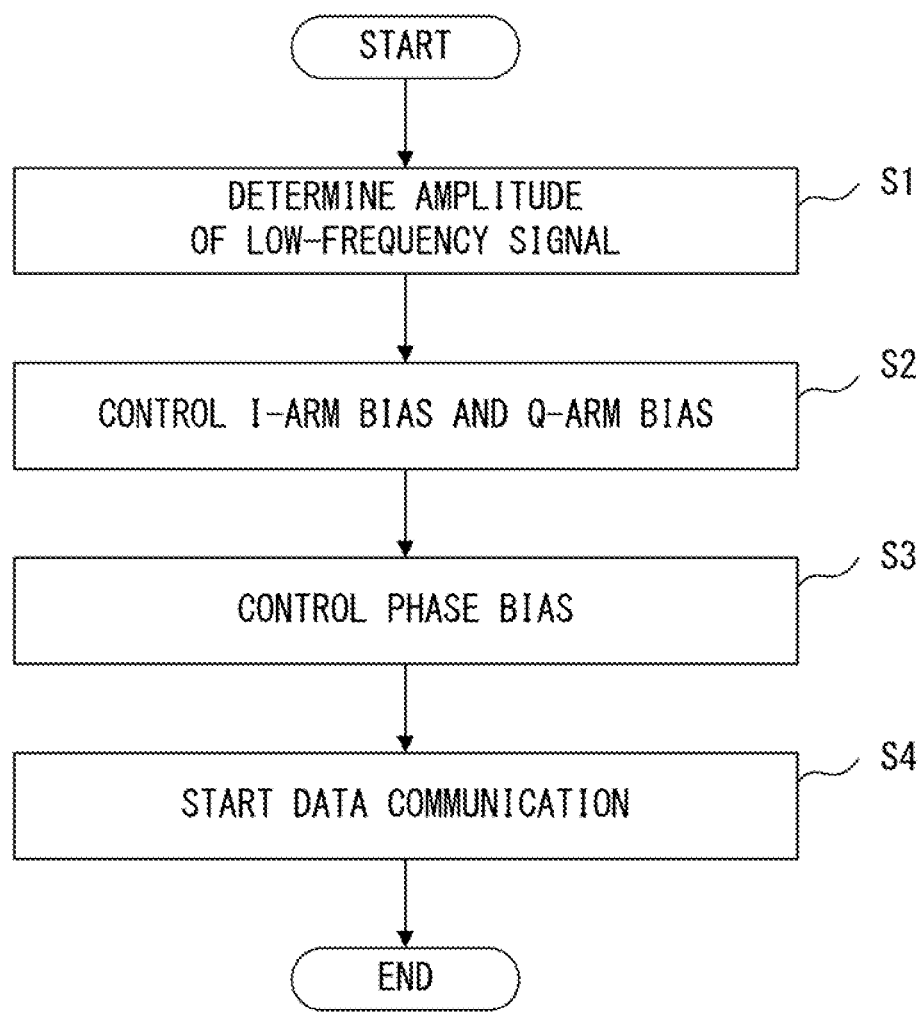
F I G. 9

OPTICAL MODULATOR AND CONTROL METHOD OF OPTICAL MODULATOR

CROSS-REFERENCE TO RELATED APPLICATION

This application is based upon and claims the benefit of priority of the prior Japanese Patent Application No. 2020-006613, filed on Jan. 20, 2020, the entire contents of which are incorporated herein by reference.

FIELD

The embodiments discussed herein are related to an optical modulator and a control method of the optical modulator.

BACKGROUND

An optical modulator is one of key devices for attaining speed-enhancement for an optical transmission system or increasing the capacity thereof. In particular, Mach-Zehnder modulators can generate modulated optical signals corresponding to desired modulation schemes and thus have been put into practical use widely.

FIG. 1 illustrates an example of a Mach-Zehnder modulator. In this example, the Mach-Zehnder modulator is operated as an IQ modulator. Thus, the Mach-Zehnder modulator includes an I-arm optical path and a Q-arm optical path. A Mach-Zehnder interferometer MZM_I is provided on the I-arm optical path. A Mach-Zehnder interferometer MZM_Q is provided on the Q-arm optical path. In addition, the Mach-Zehnder modulator includes a phase shifter 11. The phase shifter 11 adjusts at least one of the phase of light propagating through the I-arm optical path or the phase of light propagating through the Q-arm optical path such that the difference between these phases becomes equal to a specified target value. In the example depicted in FIG. 1, the phase shifter 11 is provided on the Q-arm optical path and adjusts the phase of light propagating through the Q-arm optical path. The target value for the phase difference is, for example, $\pi/2$. Note that the following descriptions are based on the assumption that $\pi/2$ includes "$\pi/2+2n\pi$ (n is an arbitrary integer)".

The Mach-Zehnder modulator generates a modulated optical signal by modulating continuous wave light generated by a light source (LD) 100. In particular, the continuous wave light generated by the light source 100 is split and guided to the I-arm optical path and the Q-arm optical path. Then, the Mach-Zehnder interferometer MZM_I generates an optical signal I by modulating the continuous wave light with data I. The Mach-Zehnder interferometer MZM_Q generates an optical signal Q by modulating the continuous wave light with data Q. The Mach-Zehnder modulator generates a modulated optical signal by combining the optical signal I and the optical signal Q.

In this case, bias control for the Mach-Zehnder modulator is performed to generate a high-quality modulated optical signal. I-arm bias control and Q-arm bias control each configure a null point. In particular, the I-arm bias control minimizes the power of light output from the Mach-Zehnder interferometer MZM_I. The Q-arm bias control minimizes the power of light output from the Mach-Zehnder interferometer MZM_Q. Meanwhile, the phase bias control adjusts the phase difference between the I-arm optical path and the Q-arm optical path to a target value (in this example, $\pi/2$).

Bias control for a Mach-Zehnder modulator is described in, for example, International Publication Pamphlet No. WO 2017/082349, International Publication Pamphlet No. WO 2014/034047, Japanese Laid-open Patent Publication No. 2019-074612, Japanese Laid-open Patent Publication No. 2017-116746, and Japanese Laid-open Patent Publication No. 2017-188829.

A long time may be needed before a preferable state is attained when controlling the three biases indicated in FIG. 1 by using the conventional technique. The operation efficiency of a communication system will be reduced if a long time is needed for bias control. For example, when a communication device is restarted due to a failure or the like in a communication system, bias control for an optical modulator may be performed. In this case, the influence of the failure could be increased if a long time is needed for the bias control.

SUMMARY

According to an aspect of the embodiments, an optical modulator includes: a Mach-Zehnder modulator; and a processor configured to control a bias of the Mach-Zehnder modulator. The Mach-Zehnder modulator includes an input optical circuit that brunches and guides input light to a first optical path and a second optical path, a first Mach-Zehnder interferometer that is formed on the first optical path, a second Mach-Zehnder interferometer that is formed on the second optical path, a phase shifter that adjusts a phase difference between the first optical path and the second optical path, and an output optical circuit that combines output light of the first Mach-Zehnder interferometer and output light of the second Mach-Zehnder interferometer to output an optical signal. The processor outputs a first bias signal for controlling an operation point of the first Mach-Zehnder interferometer, a second bias signal for controlling an operation point of the second Mach-Zehnder interferometer, and a third bias signal for controlling a phase-shift amount of the phase shifter, a low-frequency signal being superimposed on the third bias signal. The processor controls the first bias signal, the second bias signal, and the third bias signal based on a frequency component of the low-frequency signal that is included in the optical signal.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 is a flowchart illustrating an example of a method for controlling biases;

FIGS. 16A and 168 illustrate AC components included in output light when the amplitude of a low-frequency signal is greater than π and a phase bias is not appropriate;

DESCRIPTION OF EMBODIMENTS

Figure 1:
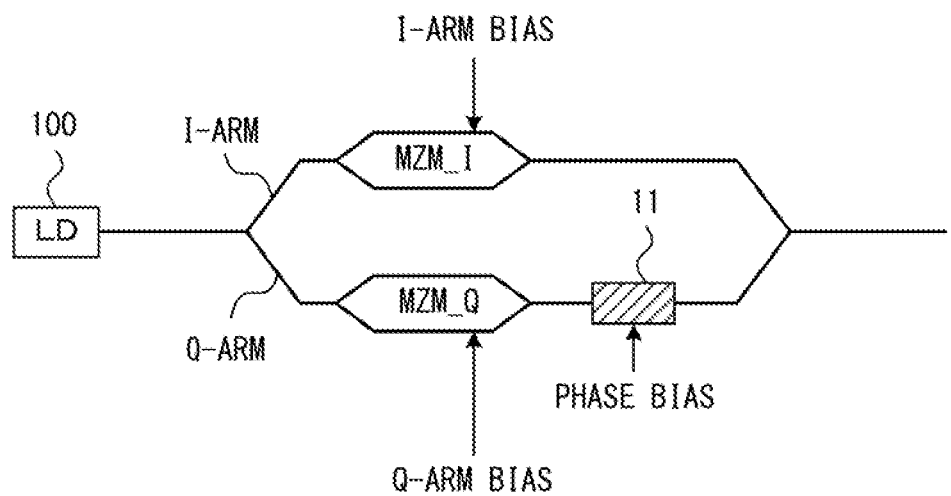
FIG. 1 illustrates an example of a Mach-Zehnder modulator.
Figure 2:
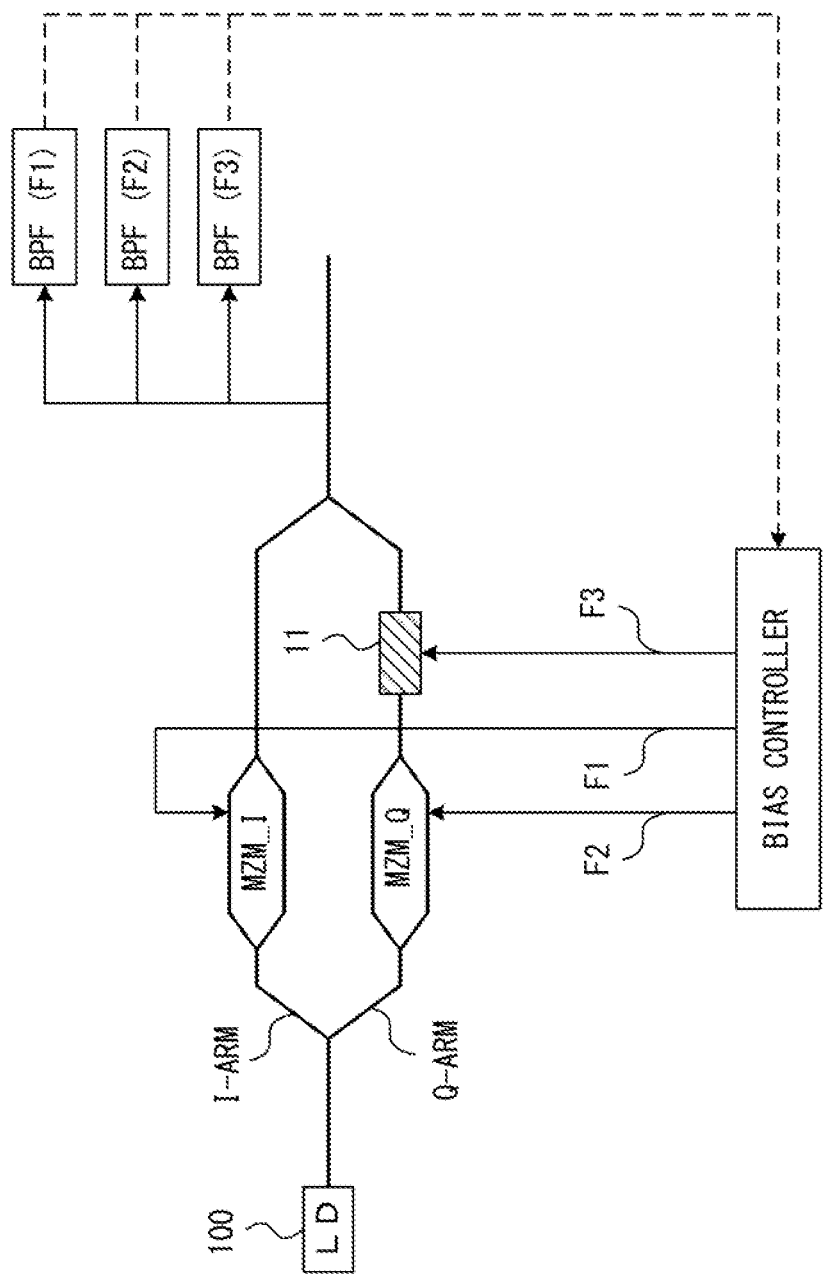
FIG. 2 illustrates an example of bias control for a Mach-Zehnder modulator.

FIG. 2 illustrates an example of bias control for a Mach-Zehnder modulator. In the example depicted in FIG. 2, the frequencies of low-frequency signals superimposed on bias signals are different from each other. In particular, a bias signal for controlling an operation point of a Mach-Zehnder interferometer MZM_I is modulated with a low-frequency signal F1, a bias signal for controlling an operation point of a Mach-Zehnder interferometer MZM_Q is modulated with a low-frequency signal F2, and a bias signal for controlling a phase-shift amount of a phase shifter 11 is modulated with a low-frequency signal F3. In this case, the Mach-Zehnder modulator includes bandpass filters for extracting the low-frequency signals F1, F2, and F3 from output light. A bias controller controls the operation point of the Mach-Zehnder interferometer MZM_I, the operation point of the Mach-Zehnder interferometer MZM_Q, and the phase-shift amount of the phase shifter 11 respectively by using the low-frequency signals F1, F2, and F3 extracted from output light.

However, this configuration needs many bandpass filters for extracting low-frequency signals from output light. Thus, the optical modulator is large in size, and the cost for the optical modulator is high.

Figure 3:
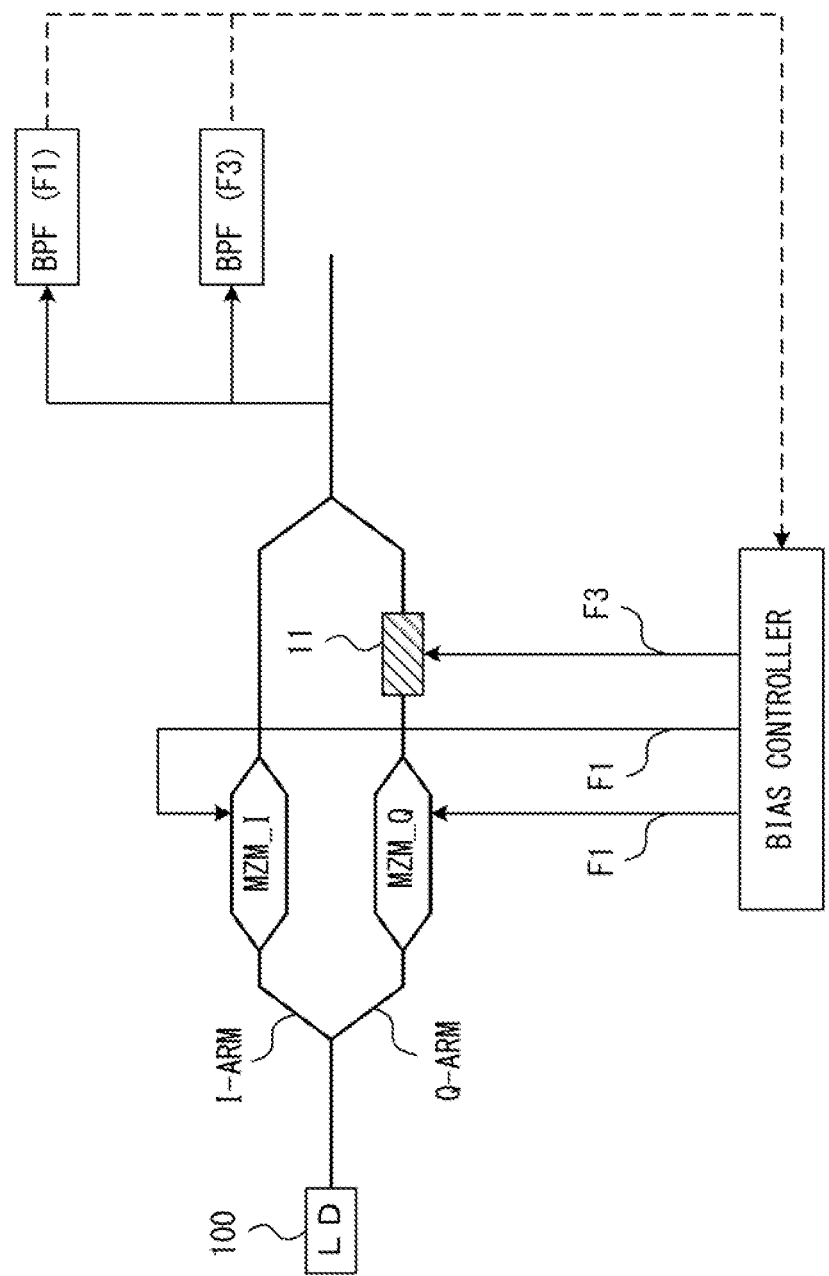
FIG. 3 illustrates another example of bias control for a Mach-Zehnder modulator.

FIG. 3 illustrates another example of bias control for a Mach-Zehnder modulator. In the example depicted in FIG. 3, a bias signal for controlling the operation point of the Mach-Zehnder interferometer MZM_I and a bias signal for controlling the operation point of the Mach-Zehnder interferometer MZM_Q are modulated with low-frequency signals of the same frequency. In this configuration, the number of bandpass filters is smaller than that in the configuration depicted in FIG. 2. However, in this configuration, when the phase-shift amount of the phase shifter 11 is not adjusted to a target value, it will be difficult to adjust the operation points of the Mach-Zehnder interferometers MZM_I and MZM_Q due to interference between a pair of low-frequency signals supplied to the Mach-Zehnder interferometers MZM_I and MZM_Q. In addition, adjusting the operation points of the Mach-Zehnder interferometers MZM_I and MZM_Q will change the target phase-shift amount for the phase shifter 11. That is, a step of adjusting the Mach-Zehnder interferometers MZM_I and MZM_Q and a step of adjusting the phase shifter 11 may be alternatively performed many times. Thus, a long time will be needed for bias control in this configuration.

Figure 4:
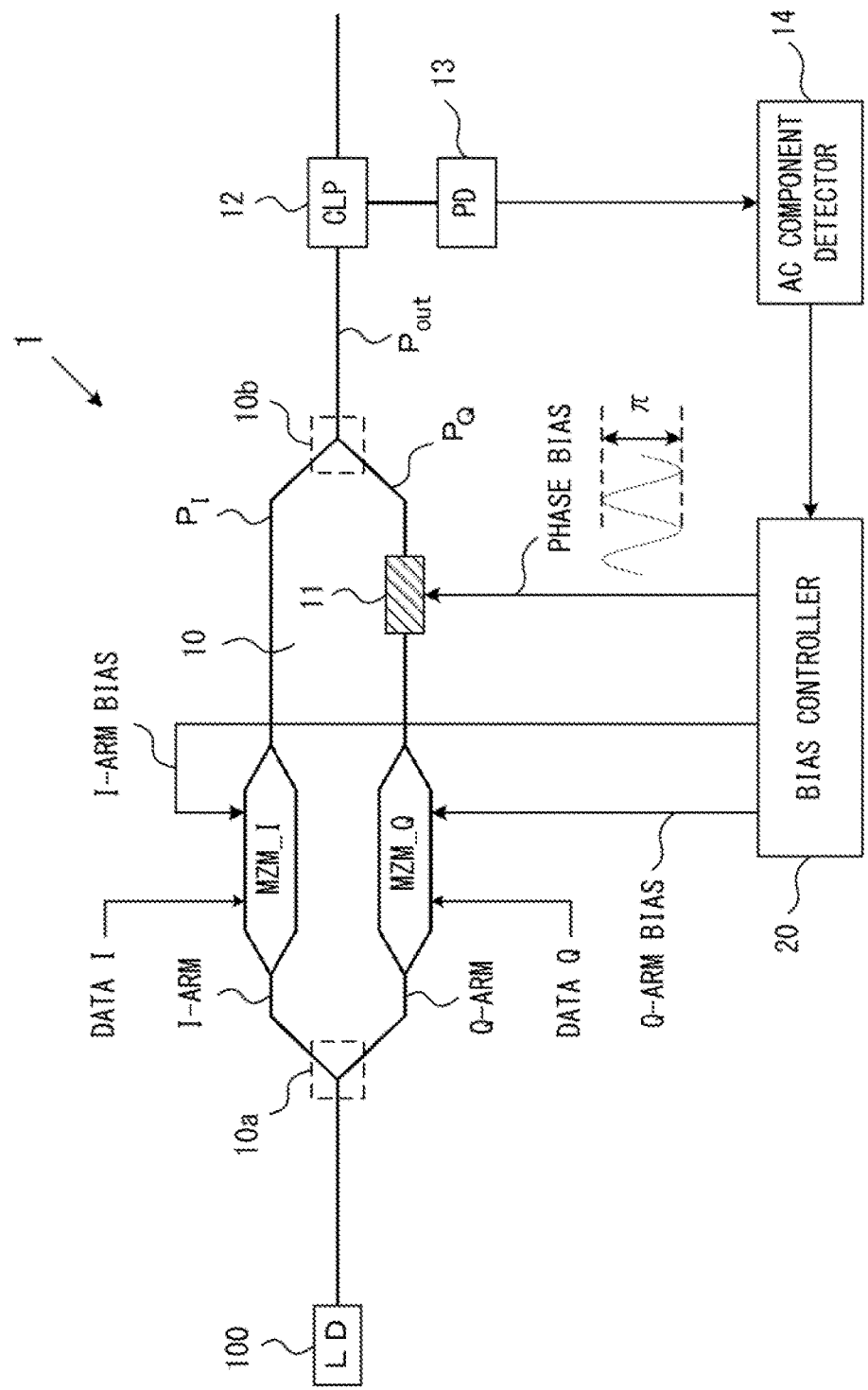
FIG. 4 illustrates an example of an optical modulator in accordance with embodiments of the invention.

FIG. 4 illustrates an example of an optical modulator in accordance with embodiments of the invention. An optical modulator 1 in accordance with embodiments of the invention includes a Mach-Zehnder modulator 10, an optical coupler 12, a photodetector 13, an AC component detector 14, and a bias controller 20. The optical modulator 1 may include other elements that are not depicted in FIG. 4.

The Mach-Zehnder modulator 10 includes an input optical circuit 10a, a Mach-Zehnder interferometer MZM_I, a Mach-Zehnder interferometer MZM_Q, a phase shifter 11, and an output optical circuit 10b. Continuous wave light generated by a light source LD) 100 is input to the Mach-Zehnder modulator 10.

The input optical circuit 10a splits and guides the continuous wave light generated by the light source 100 to an I-arm optical path and a Q-arm optical path. For example, the input optical circuit 10a may be formed by an optical waveguide. The I-arm optical path and the Q-arm optical may be formed respectively by optical waveguides.

The Mach-Zehnder interferometer MZM_I is provided on the I-arm optical path. The Mach-Zehnder interferometer MZM_Q is provided on the Q-arm optical path. The Mach-Zehnder interferometers MZM_I and MZM_Q may be formed respectively by optical waveguides. Each of the Mach-Zehnder interferometers MZM_I and MZM_Q includes an electrode for receiving a bias signal and an electrode for receiving a data signal. The bias signal is generated by the bias controller 20. The data signal is generated by a data signal generation circuit (not illustrated).

The phase shifter 11 adjusts the phase difference between the I-arm optical path and the Q-arm optical path in accordance with a phase bias signal generated by the bias controller 20. In particular, the phase shifter 11 adjusts at least one of the phase of light propagating through the I-arm optical path and arriving at the output optical circuit 10b or the phase of light propagating through the Q-arm optical path and arriving at the output optical circuit 10b such that the difference between these phases becomes equal to a specified target value. In the example depicted in FIG. 4, the phase shifter 11 is provided on the Q-arm optical path and adjusts the phase of light propagating through the Q-arm optical path. The target value is, for example, π/2.

The output optical circuit 10b combines output light of the Mach-Zehnder interferometer MZM_I and output light of the Mach-Zehnder interferometer MZM_Q to output an optical signal. For example, the output optical circuit 10b may be formed by an optical waveguide.

The optical coupler (CLP) 12 splits and guides an optical signal output from the Mach-Zehnder modulator 10 to the photodetector (PD) 13. Thus, the optical coupler 12 is used as an optical splitter. The photodetector 13 converts the received optical signal into an electric signal. Accordingly, an electric signal indicating the optical signal output from the Mach-Zehnder modulator 10 is generated. The AC component detector 14 detects an AC component in the output signal of the photodetector 13. Accordingly, the AC component detector 14 detects an AC component included in an optical signal output from the Mach-Zehnder modulator 10.

The bias controller 20 performs bias control for the Mach-Zehnder modulator 10 by using the AC component detected by the AC component detector 14. In particular, the bias controller 20 optimizes the operation points of the Mach-Zehnder interferometers MZM_I and MZM_Q and also optimizes the phase-shift amount of the phase shifter 11.

In the optical modulator 1, continuous wave light generated by the light source 100 is split and guided to the I-arm optical path and the Q-arm optical path. Then, the Mach-Zehnder interferometer MZM_I generates an optical signal I by modulating the continuous wave light with a data signal I. The Mach-Zehnder interferometer MZM_Q generates an optical signal Q by modulating the continuous wave light with a data signal Q. The Mach-Zehnder modulator 10 generates a modulated optical signal by combining the optical signals I and Q.

In this case, the optical modulator 1 makes initial settings for a bias signal so as to generate a high-quality modulated optical signal. In particular, I-arm bias control, Q-arm bias control, and phase bias control are performed. The I-arm bias control minimizes the power of light output from the Mach-Zehnder interferometer MZM_I when a data signal I is not supplied. The Q-arm bias control minimizes the power of light output from the Mach-Zehnder interferometer MZM_Q when a data signal Q is not supplied. The phase bias control adjusts the phase difference between the I-arm optical path and the Q-arm optical path to a target value (in this example, $\pi/2$). The following describes the bias control.

The bias controller 20 generates an I-arm bias signal for adjusting the operation point of the Mach-Zehnder interferometer MZM_I, a Q-arm bias signal for adjusting the operation point of the Mach-Zehnder interferometer MZM_Q, and a phase bias signal for adjusting the phase-shift amount of the phase shifter 11. The I-arm bias signal and the Q-arm bias signal are each a DC voltage signal. The phase bias signal is obtained by modulating a DC voltage signal with a modulating signal of a specified frequency. The frequency of the modulating signal is sufficiently low in comparison with the symbol rate of the data signal I or Q. Accordingly, the modulating signal may hereinafter be referred to as a "low-frequency signal".

Figure 5:
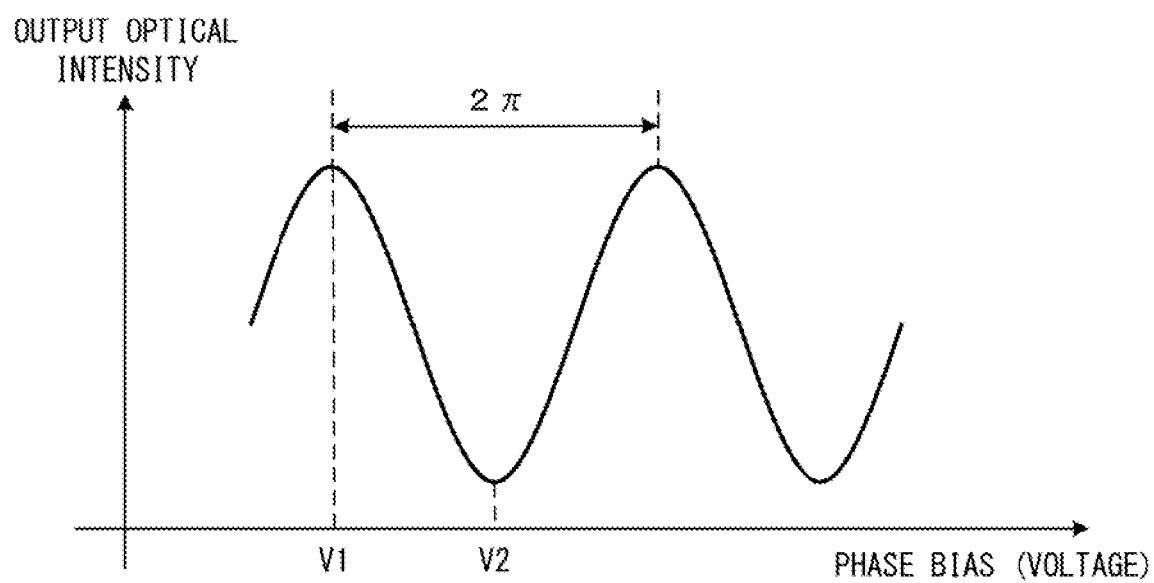
FIG. 5 illustrates characteristics of a Mach-Zehnder modulator.

The amplitude of the low-frequency signal is preferably set to, but is not particularly limited to, "$\pi$ (or $V\pi$)". The intensity of output light of the Mach-Zehnder modulator 10 periodically changes with respect to the voltage of the phase bias signal, as depicted in FIG. 5. A voltage change amount for changing the intensity of output light by one cycle is defined as "$2\pi$ (or $2V\pi$)". In this case, "$\pi$ (or $V\pi$)" corresponds to a voltage changing the intensity of output light of the Mach-Zehnder modulator 10 from a minimum value to a maximum value or a voltage changing the intensity of output light of the Mach-Zehnder modulator 10 from the maximum value to the minimum value.

The waveform of the low-frequency signal is not particularly limited. For example, the low-frequency signal may be sine waves, pulse waves, or ramp waves. The ramp waves indicate a signal in which a section with a linearly rising voltage and a section with a linearly dropping voltage are alternatively repeated.

At the start of the bias control, the bias controller 20 supplies an I-arm bias signal, a Q-arm bias signal, and a phase bias signal to the Mach-Zehnder modulator 10. Continuous wave light generated by the light source 100 is input to the Mach-Zehnder modulator 10. However, neither a data signal I nor a data signal Q is supplied to the Mach-Zehnder modulator 10.

In this case, an optical signal output from the Mach-Zehnder modulator 10 includes a frequency component of a low-frequency signal. This optical signal is split by the optical coupler 12 and converted into an electric signal by the photodetector 13. The AC component detector 14 detects the AC components included in an output signal of the photodetector 13. In this case, the AC component detector 14 detects the frequency component of the low-frequency signal. Accordingly, the AC component detector 14 detects the frequency component of the low-frequency signal included in the optical signal output from the Mach-Zehnder modulator 10. The AC component detector 14 outputs a monitor signal indicating the frequency component of the low-frequency signal. The monitor signal may indicate the amplitude or intensity of the frequency component of the low-frequency signal detected by the AC component detector 14.

The bias controller 20 controls the bias of the Mach-Zehnder modulator 10 according to the monitor signal output from the AC component detector 14. Accordingly, the bias controller 20 controls the I-arm bias, the Q-arm bias, and the phase bias according to the frequency component of the low-frequency signal included in the optical signal output from the Mach-Zehnder modulator 10.

In this case, the amplitude $A_I$ of the output light of the Mach-Zehnder interferometer MZM_I and the amplitude $A_Q$ of the output light of the Mach-Zehnder interferometer MZM_Q are expressed by formulae 1.

$$A_I = \sqrt{P_I} \exp(i\phi_I)$$

$$A_Q = \sqrt{P_Q} \exp(i(\Phi + \phi_Q)) \quad (1)$$

$P_I$ indicates the power of output light of the Mach-Zehnder interferometer MZM_I. $P_Q$ indicates the power of output light of the Mach-Zehnder interferometer MZM_Q. $\phi_I$ indicates the amount of phase change that occurs on the I-arm optical path. $\phi_Q$ indicates the amount of phase change that occurs on the Q-arm optical path. $\Phi$ indicates the phase-shift amount of the phase shifter 11.

The power $P_{out}$ of the optical signal output from the Mach-Zehnder modulator 10 is expressed by formulae 2.

$$P_{out} = P_I + P_Q + 2\sqrt{P_I \cdot P_Q} \cdot \cos(\Phi + \Delta\phi)$$

$$\Phi = \Phi_0 + f(t)$$

$$\Phi_{max} = \Phi_0 + \pi/2$$

$$\Phi_{min} = \Phi_0 - \pi/2$$

$$\Delta\phi = \phi_Q - \phi_I \quad (2)$$

The phase-shift amount $\Phi$ is controlled by the phase bias signal. $\Phi_0$ indicates the DC voltage of the phase bias signal. $f(t)$ indicates the low-frequency signal. The amplitude of the low-frequency signal is $\pi$, for example. Thus, the phase-shift amount of the phase shifter 11 varies within a range from $\Phi_0 - \pi/2$ to $\Phi_0 + \pi/2$. Hence, the maximum value and the minimum value of the phase-shift amount of the phase shifter 11 are respectively $\Phi_0 + \pi/2$ and $\Phi_0 - \pi/2$.

As described above, the optical signal output from the Mach-Zehnder modulator 10 is split by the optical coupler 12 and converted into an electric signal by the photodetector 13. The AC component detector 14 detects the AC component included in the output signal of the photodetector 13. Thus, the AC component $E_{AC}$ detected by the AC component detector 14 (i.e., the frequency components of the low-frequency signal included in the optical signal output from the Mach-Zehnder modulator 10) are expressed by formula 3.

$$E_{AC} \propto 2\sqrt{P_I \cdot P_Q} \cdot [\cos(\Phi + \Delta\phi) - E(\cos(\Phi + \Delta\phi))] \quad (3)$$

E(cos(Φ+Δφ)) indicates an average value. Thus, E(cos(Φ+Δφ)) varies according to the magnitudes of $\Phi_0$ and Δφ.

The bias controller 20 performs bias control based on the AC component $E_{AC}$ detected by the AC component detector 14. In particular, the bias control is performed using the following procedure.

The bias controller 20 adjusts the voltage value of the I-arm bias signal so as to set the operation point of the Mach-Zehnder interferometer MZM_I to a null point. In particular, the bias controller 20 decreases the power of output light of the Mach-Zehnder interferometer MZM_I. Preferably, the bias controller 20 minimizes the power of output light of the Mach-Zehnder interferometer MZM_I. Note that the Q-arm bias is fixed when adjusting the I-arm bias. In this example, the power of output light of the Mach-Zehnder interferometer MZM_I is minimized by adjusting the I-arm bias but is not made zero.

As indicated by formula 3, the amplitude of the AC component $E_{AC}$ is proportional to the squire root of the product of the power $P_I$ of output light of the Mach-Zehnder interferometer MZM_I and the power $P_Q$ of output light of the Mach-Zehnder interferometer MZM_Q. Thus, decreasing the power of output light of the Mach-Zehnder interferometer MZM_I will decrease the amplitude of the AC component $E_{AC}$. Accordingly, the bias controller 20 adjusts the voltage value of the I-arm bias signal so as to minimize the amplitude of the AC component $E_{AC}$. As a result, the operation point of the Mach-Zehnder interferometer MZM_I is set to a null point.

Next, the bias controller 20 adjusts the voltage of the Q-arm bias signal so as to set the operation point of the Mach-Zehnder interferometer MZM_Q to a null point. In particular, the bias controller 20 decreases the power of output light of the Mach-Zehnder interferometer MZM_Q. Preferably, the bias controller 20 minimizes the power of output light of the Mach-Zehnder interferometer MZM_Q. Note that the I-arm bias has already been optimized when the Q-arm bias is adjusted. In this example, the power of output light of the Mach-Zehnder interferometer MZM_Q is minimized by adjusting the Q-arm bias but is not made zero.

As indicated by formula 3, the amplitude of the AC component $E_{AC}$ is proportional to the square root of the product of the power $P_I$ and the power $P_Q$. Thus, decreasing the power of output light of the Mach-Zehnder interferometer MZM_Q will decrease the amplitude of the AC component $E_{AC}$. Accordingly, the bias controller 20 adjusts the voltage value of the Q-arm bias signal so as to minimize the amplitude of the AC component $E_{AC}$. As a result, the operation point of the Mach-Zehnder interferometer MZM_Q is also set to a null point.

As described above, the operation points of the Mach-Zehnder interferometers MZM_I and MZM_Q are each set to a null point. In this example, the bias of the Mach-Zehnder interferometer MZM_Q is adjusted after the bias of the Mach-Zehnder interferometer MZM_I is adjusted. However, the invention is not limited to this procedure. In particular, the bias controller 20 may adjust the bias of the Mach-Zehnder interferometer MZM_I after adjusting the bias of the Mach-Zehnder interferometer MZM_Q.

Subsequently, the bias controller 20 optimizes the phase-shift amount of the phase shifter 11 by adjusting the DC voltage value of a phase bias signal. In particular, the phase-shift amount of the phase shifter 11 is controlled such that the phase difference between the I-arm optical path and the Q-arm optical path becomes π/2. The I-arm bias and the Q-arm bias are fixed when adjusting the phase bias. Thus, the operation points of the Mach-Zehnder interferometers MZM_I and MZM_Q are each fixed at a null point when adjusting the phase bias.

After the adjustments of the I-arm bias and the Q-arm bias are finished, $P_I$ and $P_Q$ are fixed values, and thus the AC component $E_{AC}$ are expressed by formula 4.

$$E_{AC} \propto \cos(\Phi + \Delta\phi) - E(\cos(\Phi + \Delta\phi)) \quad (4)$$

Accordingly, the amplitude of the AC component $E_{AC}$ is determined by the difference between the maximum value and the minimum value of cos(Φ+Δφ).

Figure 6A:
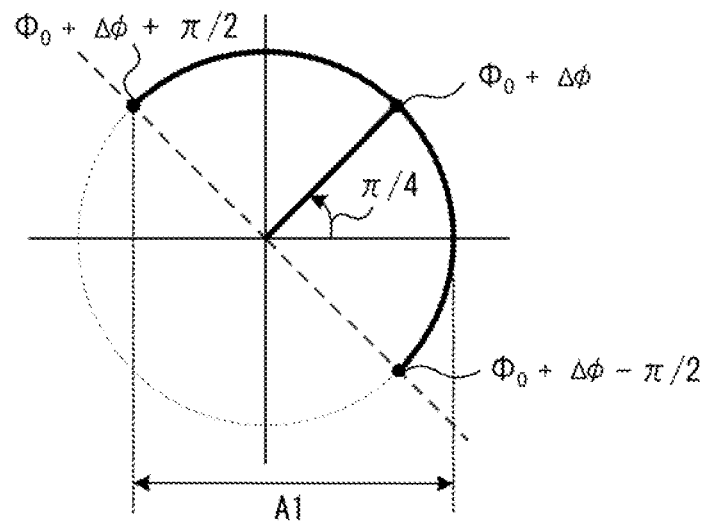
FIGS. 6A-6C illustrate relationships between a phase bias and the amplitude of AC components.
Figure 6B:
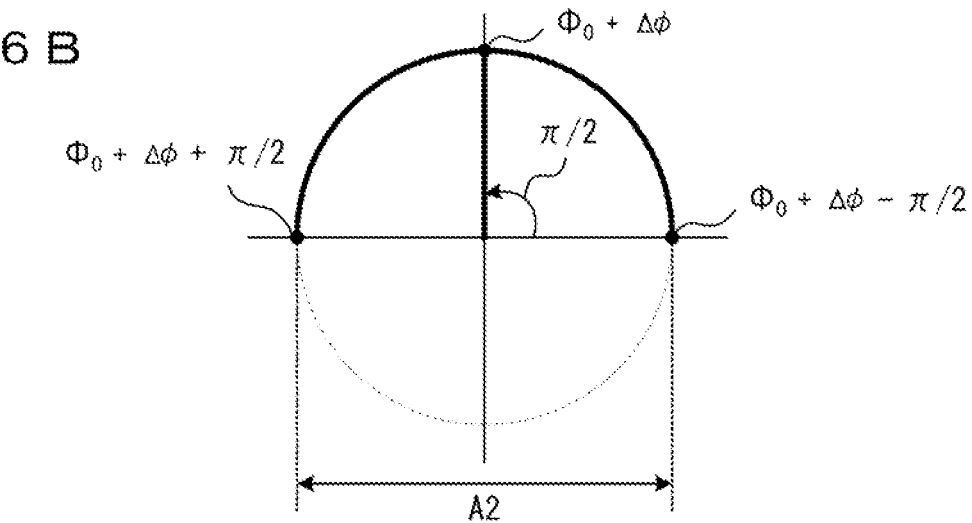
Figure 6C:
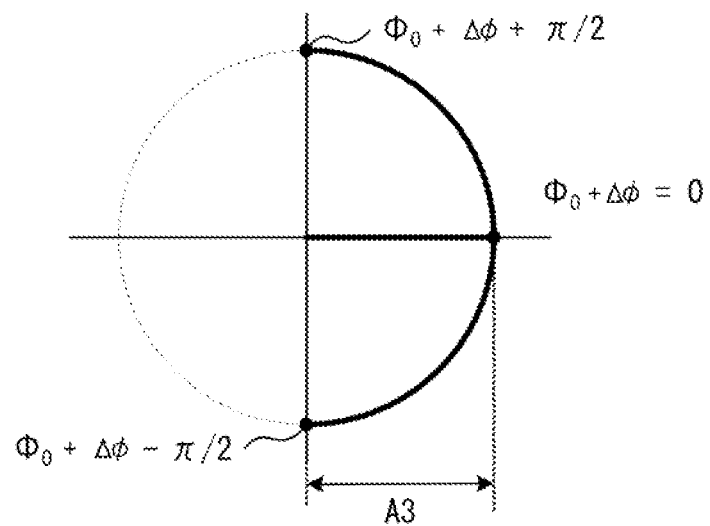

FIGS. 6A-6C illustrate relationships between a phase bias and the amplitude of AC components $E_{AC}$. In the example depicted in FIG. 6A, the phase-shift amount of the phase shifter 11 is not optimized. That is, $\Phi_0$+Δφ is not π/2. As an example, $\Phi_0$+Δφ may be set to π/4. In this case, the amplitude of the AC components $E_{AC}$ is proportional to A1.

By contrast, in the example depicted in FIG. 6B, the phase-shift amount of the phase shifter 11 is optimized. Specifically, $\Phi_0$+Δφ is π/2. In this case, the amplitude of AC components $E_{AC}$ is proportional to A2. Note that A2 is greater than A1 and is a maximum amplitude.

In the example depicted in FIG. 6C, $\Phi_0$+Δφ is zero. In this case, the amplitude of the AC components $E_{AC}$ is proportional to A3. A3 is a minimum amplitude. Thus, the amplitude of the AC components $E_{AC}$ is minimized when $\Phi_0$+Δφ is zero.

Figure 7A:
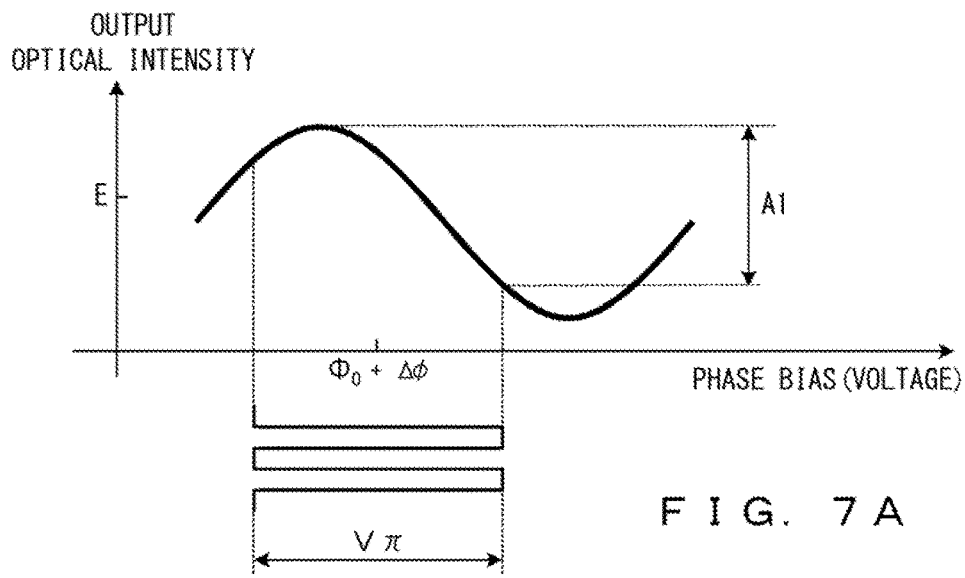
FIGS. 7A-7C schematically illustrate relationships between a phase bias and the amplitude of AC components.
Figure 7B:
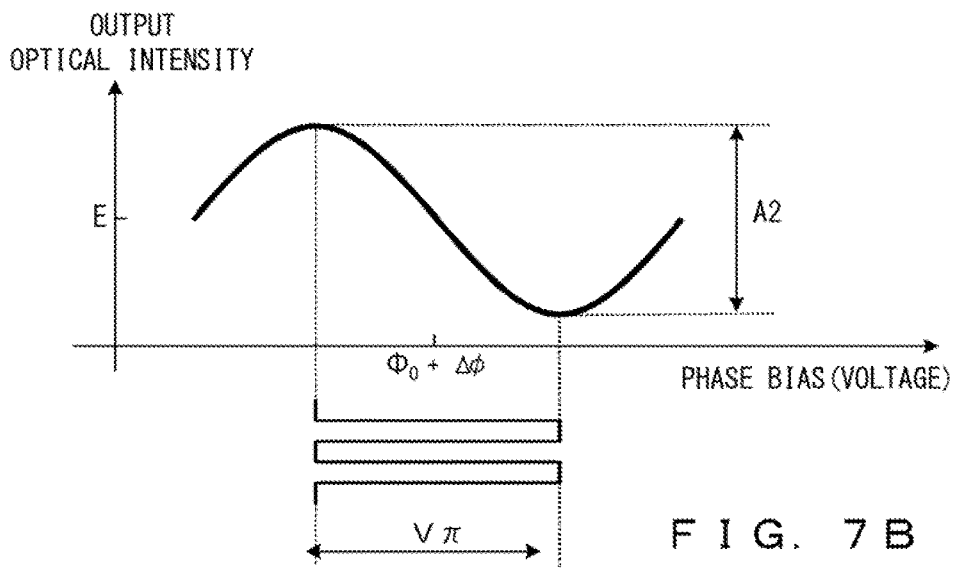
Figure 7C:
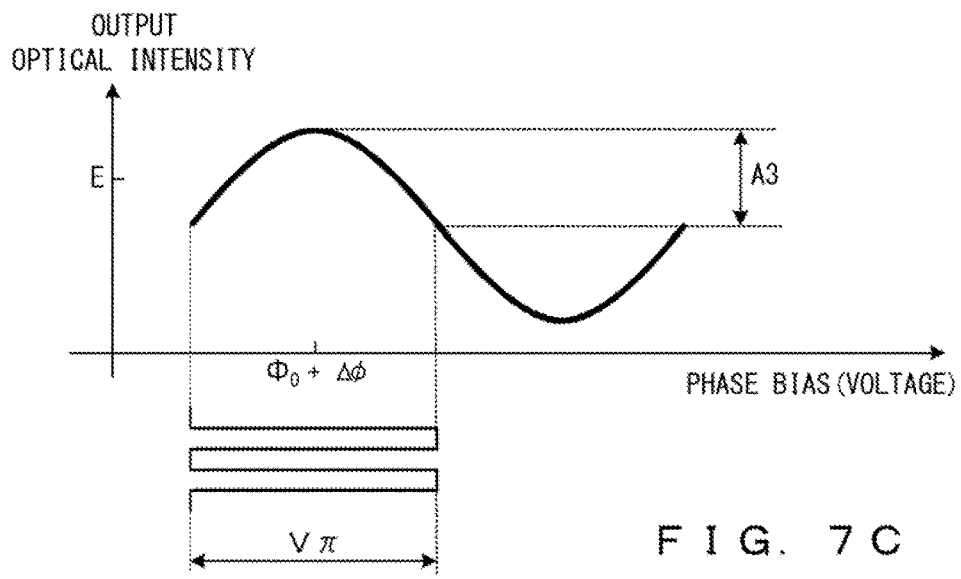

FIGS. 7A-7C schematically illustrate relationships between a phase bias and the amplitude of AC components $E_{AC}$. FIGS. 7A, 7B, and 7C correspond to FIGS. 6A, 6B, and 6C, respectively. A phase bias signal Φ oscillates with an amplitude Vπ with a voltage $\Phi_0$ as a center. "E" indicated in FIGS. 7A-7C is the average of the AC components $E_{AC}$ and corresponds to the second term in parenthesis in the right side of formula 3 or the second term in the right side of formula 4.

As described above, optimizing the phase-shift amount of the phase shifter 1 so as to make $\Phi_0$+Δφ equal to π/2 maximizes the amplitude of the AC components $E_{AC}$. In other words, adjusting the phase-shift amount of the phase shifter 11 so as to maximize the amplitude of the AC components $E_{AC}$ makes $\Phi_0$+Δφ equal to π/2. Accordingly, the bias controller 20 adjusts a center voltage of the phase bias signal (in the above-described example, this voltage corresponds to $\Phi_0$) so as to maximize the amplitude of the AC components $E_{AC}$. As a result, the phase difference between the I-arm optical path and the Q-arm optical path is set to π/2.

Figure 8:
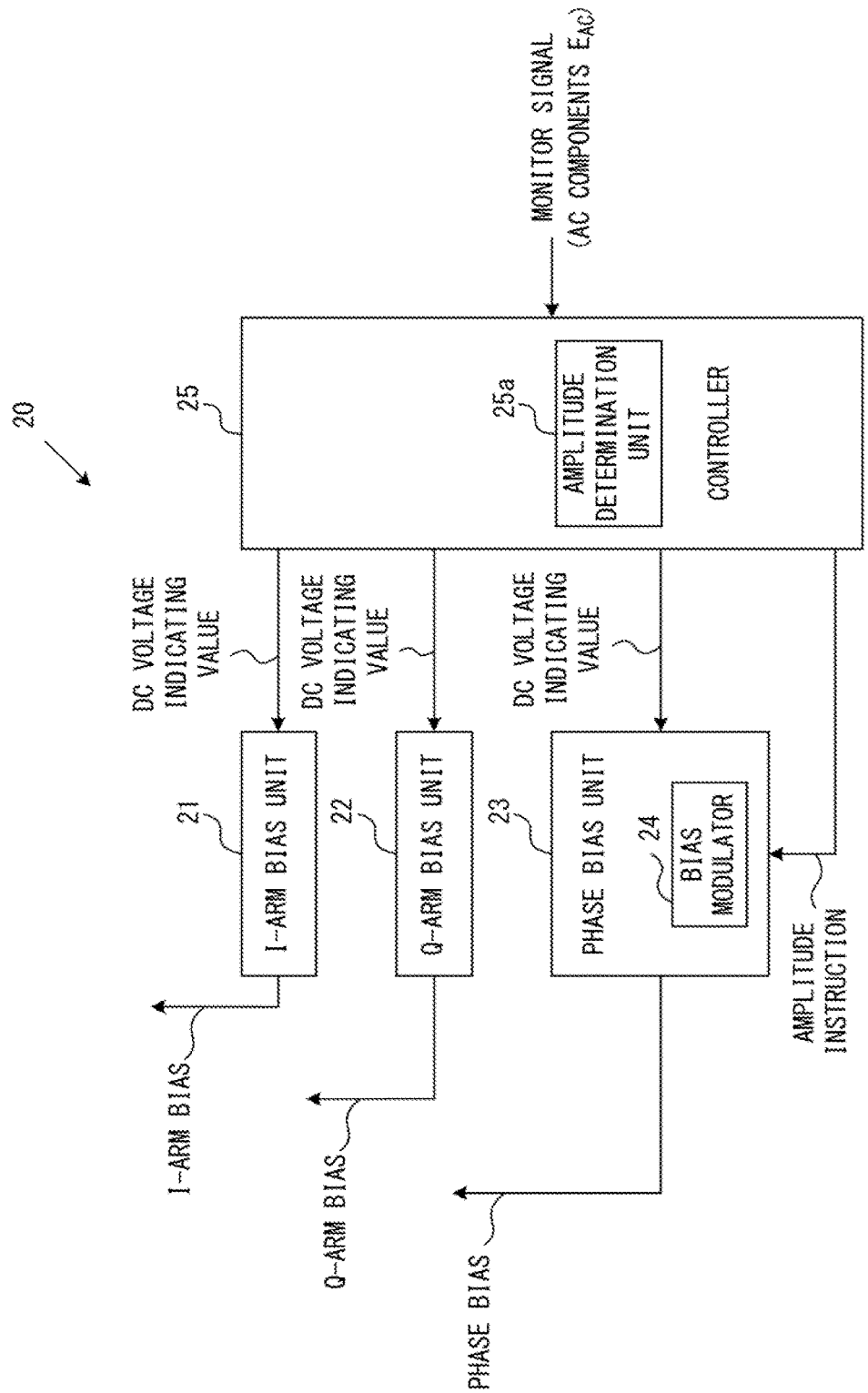
FIG. 8 illustrates an example of the configuration of a bias controller.

FIG. 8 illustrates an example of the configuration of the bias controller 20. The bias controller 20 includes an I-arm bias unit 21, a Q-arm bias unit 22, a phase bias unit 23, and a controller 25. The bias controller 20 may include other elements that are not depicted in FIG. 8.

The I-arm bias unit 21 generates an I-arm bias signal corresponding to a DC voltage indicating value supplied from the controller 25. Thus, the I-arm bias signal is a DC voltage signal. The Q-arm bias unit 21 generates a Q-arm bias signal corresponding to a DC voltage indicating value supplied from the controller 25. Thus, the Q-arm bias signal is also a DC voltage signal.

The phase bias unit 23 generates a phase bias signal corresponding to a DC voltage indicating value supplied from the controller 25. However, the phase bias unit 23 includes a bias modulator 24. The bias modulator 24 modulates a DC voltage signal corresponding to the DC voltage indicating value with a low-frequency signal of a specified frequency. That is, a low-frequency signal is superimposed on a DC voltage signal corresponding to the DC voltage indicating value. The amplitude of the low-frequency signal is designated by the controller 25.

When the bias modulator 24 includes a circuit for generating a low-frequency signal, the controller 25 gives an amplitude instruction to the bias modulator 24. The bias modulator 24 generates a low-frequency signal having an amplitude indicated by the amplitude instruction and modulates a DC voltage signal with this low-frequency signal. When a low-frequency signal is supplied from the controller 25 to the bias modulator 24, the bias modulator 24 modulates a DC voltage signal with this low-frequency signal.

The controller 25 adjusts the voltage of the I-arm bias signal, the voltage of the Q-arm bias signal, and the center voltage of the phase bias signal according to a monitor signal indicating the amplitude of AC components $E_{AC}$ detected by the AC component detector 14 (i.e., the frequency components of a low-frequency signal included in output light of the Mach-Zehnder modulator 10).

The controller 25 includes an amplitude determination unit 25a. The amplitude determination unit 25a determines an amplitude of a low-frequency signal. In this example, the amplitude of the low-frequency signal corresponds to the $V\pi$ of the Mach-Zehnder modulator 10. Thus, the amplitude determination unit 25a specifies the $V\pi$ of the Mach-Zehnder modulator 10.

For example, the amplitude determination unit 25 may monitor the power of output light of the Mach-Zehnder modulator 10 while sweeping (or scanning) the center voltage of a phase bias signal. In this example, the power of output light of the Mach-Zehnder modulator 10 periodically changes with respect to the phase bias signal, as depicted in FIG. 5. Accordingly, the amplitude determination unit 25a detects the center voltage of the phase bias signal obtained when the power of output light of the Mach-Zehnder modulator 10 is minimized and the center voltage of the phase bias signal obtained when the power of output light of the Mach-Zehnder modulator 10 is maximized. The amplitude determination unit 25a determines an amplitude for a low-frequency signal by calculating the difference between these two voltage values. In FIG. 5, V1 and V2 are detected. In this case, V2−V1 corresponds to "π (or $V\pi$)". Thus, the amplitude determination unit 25a determines an amplitude of a low-frequency signal by calculating V2−V1. Note that when the $V\pi$ of the Mach-Zehnder modulator 10 is known, the amplitude determination unit 25a may use this value as an amplitude of a low-frequency signal.

For example, the controller 25 may be implemented by a processor system that includes a processor and a memory. In this case, the processor may control the bias of the Mach-Zehnder modulator 10 by executing a bias control program stored in the memory. Alternatively, the controller 25 may be implemented by a hardware circuit such as a digital signal processing circuit.

FIG. 9 is a flowchart illustrating an example of a method for controlling biases. For example, the processes of this flowchart may be performed by the bias controller 20 before a communication device provided with the optical modulator 10 starts or resumes a data communication.

In S1, the amplitude determination unit 25a determines an amplitude of a low-frequency signal to be superimposed on a phase bias signal. In S2, the controller controls the operation point of the Mach-Zehnder interferometer MZM_I and the operation point of the Mach-Zehnder interferometer MZM_Q. In S3, the controller 25 adjusts the phase-shift amount of the phase shifter 11. Through S2-S3, the bias of the Mach-Zehnder modulator 10 is optimized. The optical modulator 1 starts or resumes a data communication with the biases in the Mach-Zehnder modulator 10 optimized. Accordingly, the optical modulator 1 modulates continuous wave light with a data signal I and a data signal Q so as to output a modulated optical signal.

Figure 10:
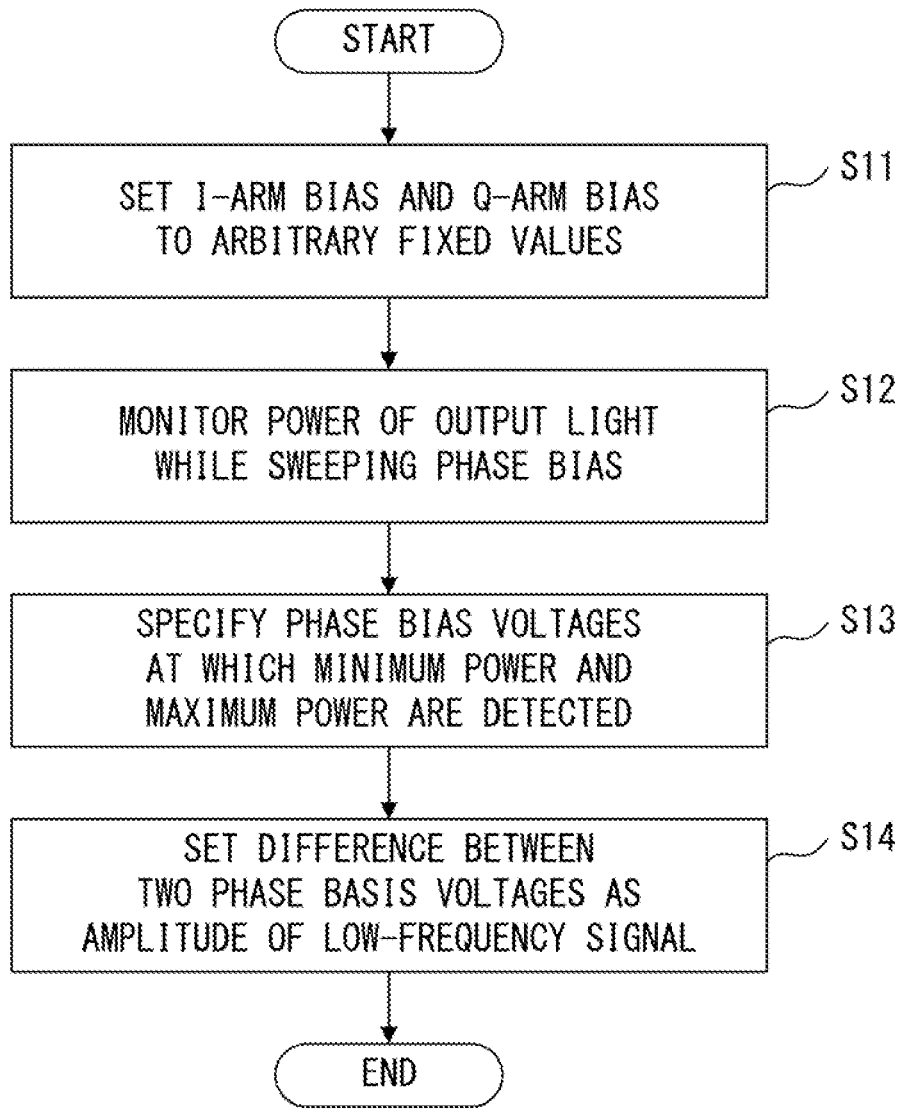
FIG. 10 is a flowchart illustrating an example of a method for determining an amplitude for a low-frequency signal.

FIG. 10 is a flowchart illustrating an example of a method for determining an amplitude for a low-frequency signal. The processes of this flowchart correspond to S1 depicted in FIG. 9.

In S11, the amplitude determination unit 25a sets the voltage of an I-arm bias signal and the voltage of a Q-arm bias signal to arbitrary fixed values. In this case, DC voltage indicating values are supplied from the controller 25 to the I-arm bias unit 21 and the Q-arm bias unit 22, and the bias controller 20 outputs the I-arm bias signal and the Q-arm bias signal. As a result, the Mach-Zehnder interferometers MZM_I and MZM_Q are held in a specified state.

In S12, the amplitude determination unit 25a monitors the power of output light of the Mach-Zehnder modulator 10 while sweeping the phase bias. In this case, the amplitude determination unit 25a gives the phase bias unit 23 an instruction to change the center voltage of the phase bias signal in increments of $\Delta V$. Every time the voltage value is changed, the amplitude determination unit 25a detects the power of output light of the Mach-Zehnder modulator 10. The detected power values are stored in a memory (not illustrated).

In S13, the amplitude determination unit 25a specifies a voltage value at which minimum power is obtained and a voltage value at which maximum power is obtained. In the example depicted in FIG. 5, the voltage value V1 at which maximum power is obtained and the voltage value V2 at which minimum power is obtained are specified.

In S14, the amplitude determination unit 25a calculates the difference between the two voltage values specified in S13. In the example depicted in FIG. 5, V2−V1 is calculated. The amplitude determination unit 25a stores the calculation result in a memory (not illustrated) as an amplitude value indicating the amplitude of the low-frequency signal.

Figure 11:
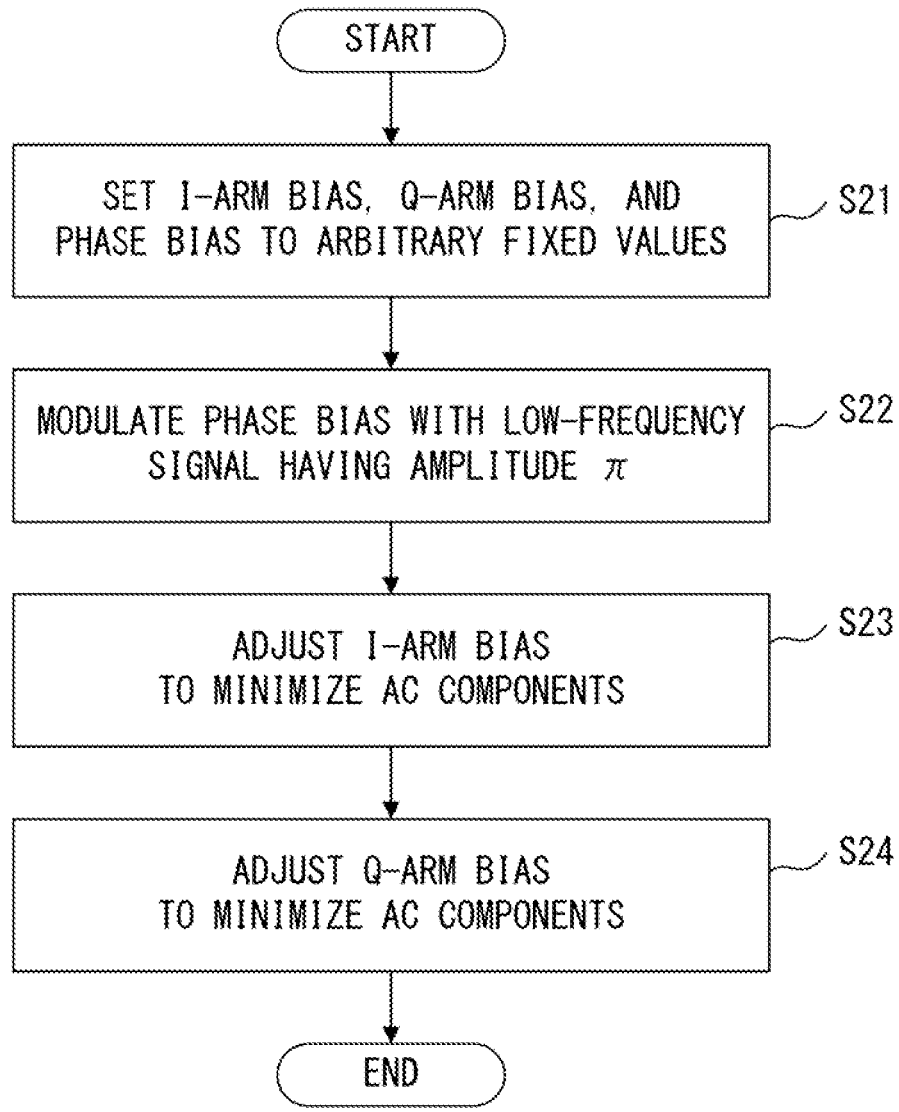
FIG. 11 is a flowchart illustrating an example of a method for controlling an I/Q bias.

FIG. 11 is a flowchart illustrating an example of a method for controlling an I/Q bias. The processes of this flowchart correspond to S2 depicted in FIG. 9.

In S21, the controller 25 sets the voltage of an I-arm bias signal, the voltage of a Q-arm bias signal, and the center voltage of a phase bias signal to arbitrary fixed values. In this case, DC voltage indicating values are supplied from the controller 25 to the I-arm bias unit 21, the Q-arm bias unit 22, and the phase bias unit 23, and the bias controller 20 outputs the I-arm bias signal, the Q-arm bias signal, and the phase bias signal.

In S22, the controller 25 reports the amplitude value calculated in S14 to the bias modulator 24. Then, the bias modulator 24 generates a low-frequency signal based on this report. The bias modulator 24 modulates a DC voltage signal generated by the phase bias unit 23 with the low-frequency signal. As a result, the voltage of the phase bias signal oscillates with amplitude n.

In S23, while keeping the voltage of the Q-arm bias signal fixed, the controller 25 adjusts the voltage of the I-arm bias signal in such a manner as to reduce AC components to be detected by the AC component detector 14. Preferably, the controller 25 adjusts the voltage of the I-arm bias signal in such a manner as to minimize AC components to be detected by the AC component detector 14. The controller 25 stores, in a memory (not illustrated), the voltage value of the I-arm bias signal obtained when the AC components are minimized.

In S24, the controller 25 adjusts the voltage of the Q-arm bias signal in such a manner as to reduce AC components to be detected by the AC component detector 14. Preferably, the controller 25 adjusts the voltage of the Q-arm bias signal in such a manner as to minimize AC components to be detected by the AC component detector 14. In this case, the voltage of the I-arm bias signal is preferably held in the state attained by the adjustment in S23. The controller 25 stores, in a memory (not illustrated), the voltage value of the Q-arm bias signal obtained when the AC components are minimized.

In the example depicted in FIG. 11, the operation point of the Mach-Zehnder interferometer MZM_I is adjusted, and then the operation point of the Mach-Zehnder interferometer MZM_Q is adjusted. However, the invention is not limited to this procedure. In particular, the controller 25 may adjust the operation point of the Mach-Zehnder interferometer MZM_Q and then adjust the operation point of the Mach-Zehnder interferometer MZM_I.

Figure 12:
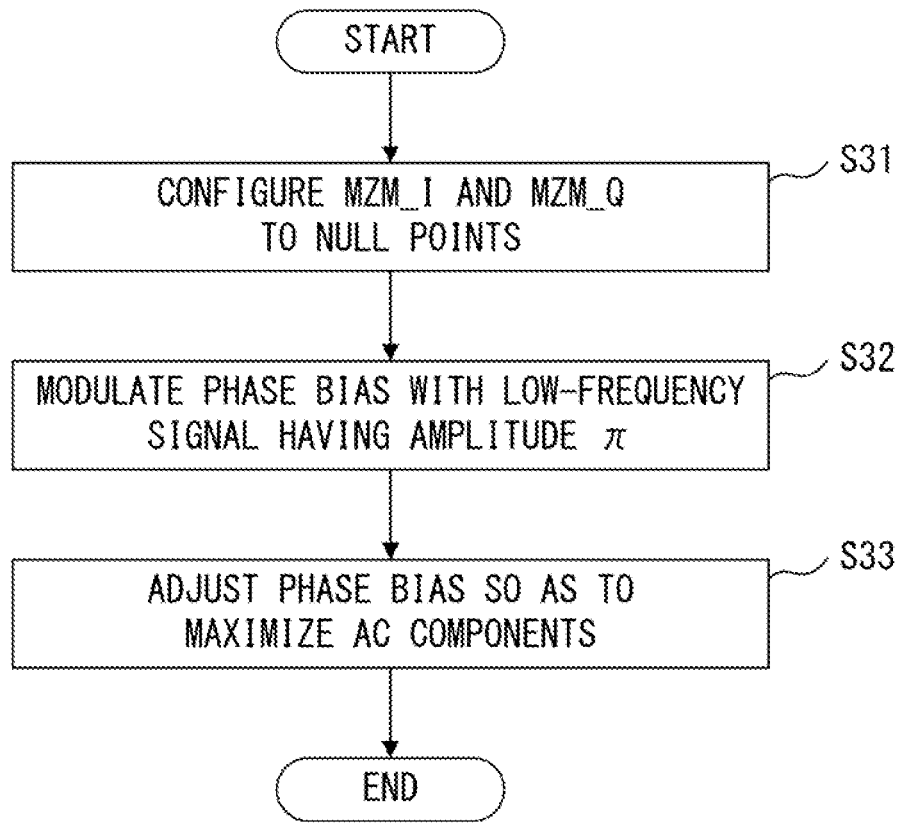
FIG. 12 is a flowchart illustrating an example of a method for controlling a phase bias.

FIG. 12 is a flowchart illustrating an example of a method for controlling a phase bias. The processes of this flowchart correspond to S3 depicted in FIG. 9.

In S31, the controller 25 configures the operation points of the Mach-Zehnder interferometers MZM_I and MZM_Q by using the results of the processes of S23-S24. In this case, the bias controller 20 outputs the I-arm bias signal having the voltage value obtained in S23 and the Q-arm bias signal having the voltage value obtained in S24. As a result, the operation points of the Mach-Zehnder interferometers MZM_I and MZM_Q are each configured to a null point.

In S32, the controller 25 reports the amplitude value calculated in S14 to the bias modulator 24. Then, the bias modulator 24 generates a low-frequency signal based on this report. The bias modulator 24 modulates a DC voltage signal generated by the phase bias unit 23 with the low-frequency signal. As a result, the voltage of the phase bias signal oscillates with an amplitude of π.

In S33, the controller 25 adjusts the center voltage of the phase bias signal in such a manner as to increase AC components to be detected by the AC component detector 14. Preferably, the controller 25 adjusts the center voltage of the phase bias signal in such a manner as to maximize AC components to be detected by the AC component detector 14. As a result, the phase-shift amount of the phase shifter 11 is adjusted such that the phase difference between the I-arm optical path and the Q-arm optical path is set to π/2.

As described above, in the bias control in accordance with embodiments of the invention, only the phase bias signal is modulated while the I-arm bias signal and the Q-arm bias signal are not modulated. Hence, the size of the circuit for detecting the frequency components of a low-frequency signal can be decreased in comparison with the configurations depicted in FIGS. 2 and 3. In addition, adjustment of the I/Q bias and adjustment of the phase bias are independent of each other. Thus, after the phase bias is adjusted, the I/Q bias does not need to be readjusted. Hence, the time needed for bias control is shortened.

The following describes the reason why the amplitude of a low-frequency signal is preferably set to π (or Vπ).

FIGS. 13A, 13B, 14A, and 14B illustrate AC components included in output light when the amplitude of a low-frequency signal is less than π. In this example, the amplitude of the low-frequency signal is φ3, which is less than π.

Figure 13A:
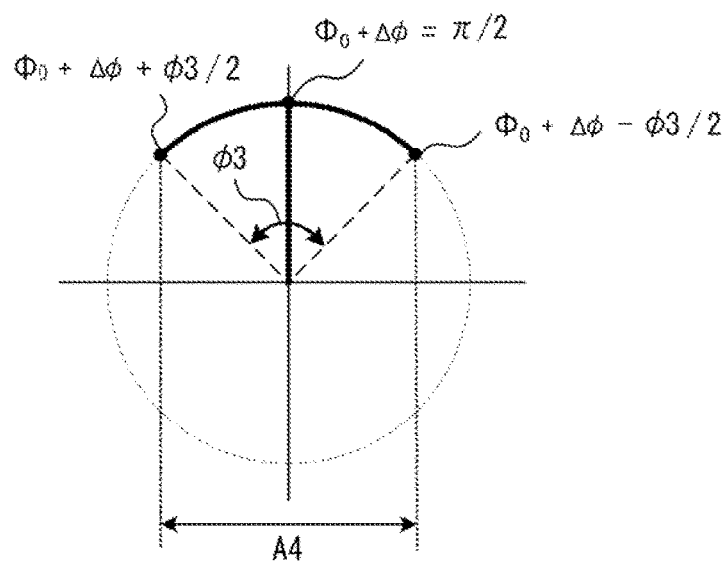
FIGS. 13A and 13B illustrate AC components included in output light when the amplitude of a low-frequency signal is less than π and a phase bias is appropriate.
Figure 13B:
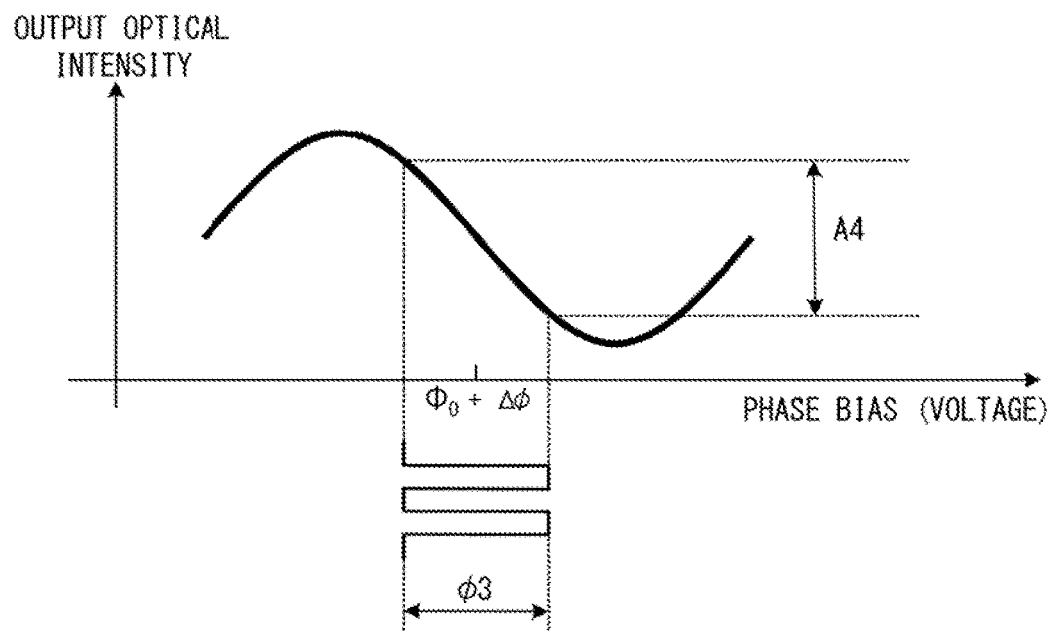

In FIGS. 13A and 13B, the phase bias of the Mach-Zehnder modulator 10 is appropriately adjusted. Thus, $\Phi_0+\Delta\phi$ is adjusted to a target value (in this example, π/2), as depicted in FIG. 13A. In this case, the voltage of the phase bias signal varies within a range from "π/2−φ3/2" to "π/2+φ3/2". In a case where $\Phi_0+\Delta\phi$ is adjusted to π/2, when the phase bias signal with a low-frequency signal having an amplitude φ3 superimposed thereon is supplied to the phase shifter 11, the amplitude of the frequency components of the low-frequency signal detected by the AC component detector 14 is A4, as depicted in FIG. 13B.

Figure 14A:
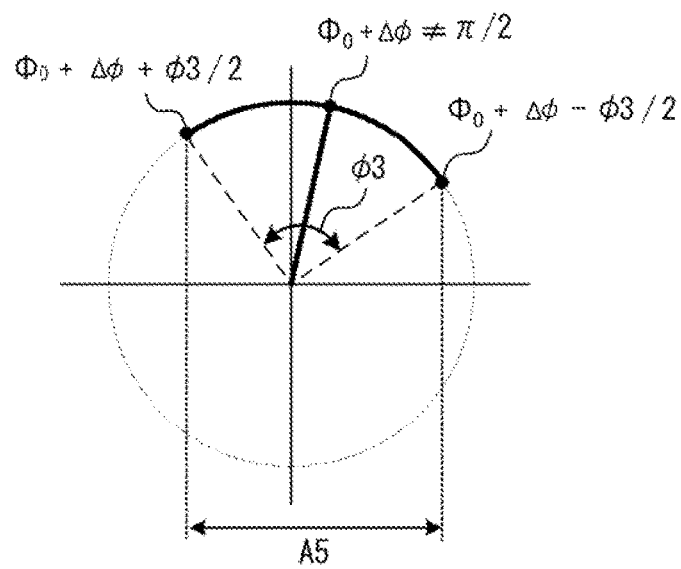
FIGS. 14A and 14B illustrate AC components included in output light when the amplitude of a low-frequency signal is less than π and a phase bias is not appropriate.
Figure 14B:
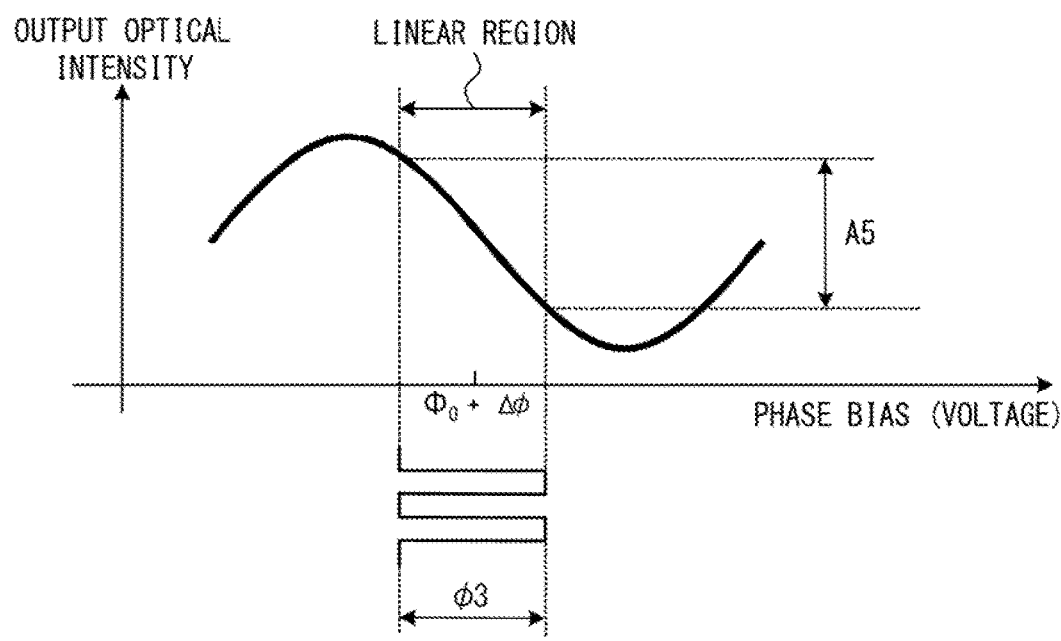

In FIGS. 14A and 14B, the phase bias of the Mach-Zehnder modulator 10 is not appropriately adjusted. Thus, $\Phi_0+\Delta\phi$ is offset from a target value (in this example, π/2), as depicted in FIG. 14A. Meanwhile, the amplitude of the frequency components of the low-frequency signal detected by the AC component detector 14 is A5, as depicted in FIG. 14B.

In this situation, in a case where the amplitude φ3 of the low-frequency signal is less than π, even when $\Phi_0+\Delta\phi$ is offset from π/2, the low-frequency signal may oscillate within a linear region in which the intensity of output light changes linearly with respect to the phase bias. In this case, the amplitude A5 is substantially the same as the amplitude A4 detected when the phase bias is appropriately adjusted. Thus, there is a small difference between the amplitude A5 detected when $\Phi_0+\Delta\phi$ is offset from π/2 and the amplitude A4 detected when the phase bias is appropriately adjusted. Accordingly, the sensitivity in adjustment for optimizing the phase bias according to the amplitude of the frequency components of the low-frequency signal detected by the AC component detector 14 is lower in a case where the amplitude of the low-frequency signal is less than π than in a case where the amplitude of the low-frequency signal is π. In other words, setting the amplitude of the low-frequency signal to π will increase the sensitivity in adjustment of the bias voltage.

FIGS. 15A, 15B, 16A, and 16B illustrate AC components included in output light when the amplitude of a low-frequency signal is greater than π. In this example, the amplitude of the low-frequency signal is φΔ, which is greater than π.

Figure 15A:
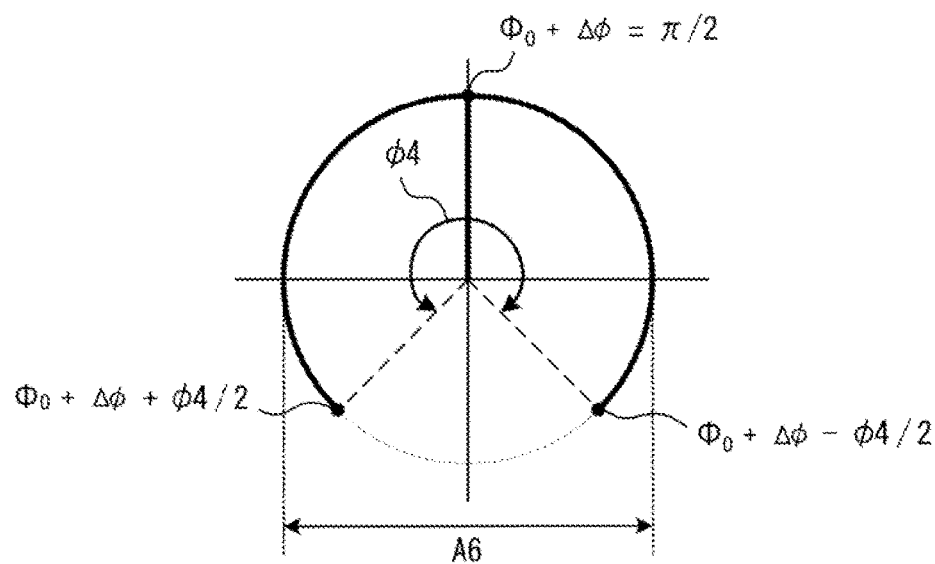
FIGS. 15A and 15B illustrate AC components included in output light when the amplitude of a low-frequency signal is greater than π and a phase bias is appropriate.
Figure 15B:
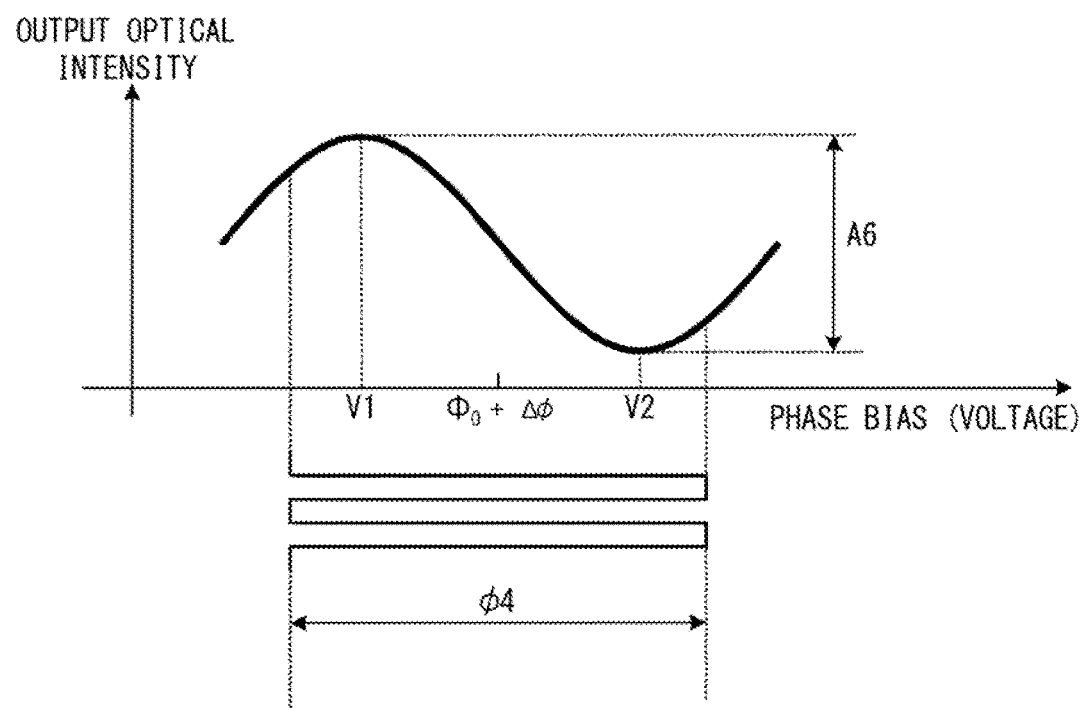

In FIGS. 15A and 15B, the phase bias of the Mach-Zehnder modulator 10 is appropriately adjusted. Thus, $\Phi_0+\Delta\phi$ is adjusted to a target value (in this example, π/2), as depicted in FIG. 15A. In this case, the voltage of the phase bias signal varies within a range from "π/2−φ4/2" to "π/2+φ4/2". In a case where $\Phi_0+\Delta\phi$ is adjusted to π/2, when the phase bias signal with a low-frequency signal having an amplitude φ4 superimposed thereon is supplied to the phase shifter 11, the amplitude of the frequency components of the low-frequency signal detected by the AC component detector 14 is A6, as depicted in FIG. 15B.

Figure 16A:
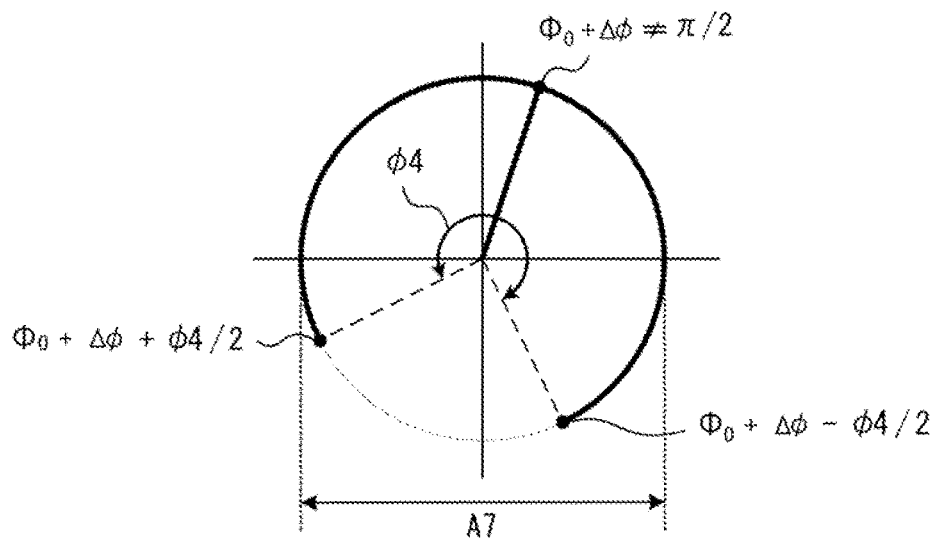
Figure 16B:
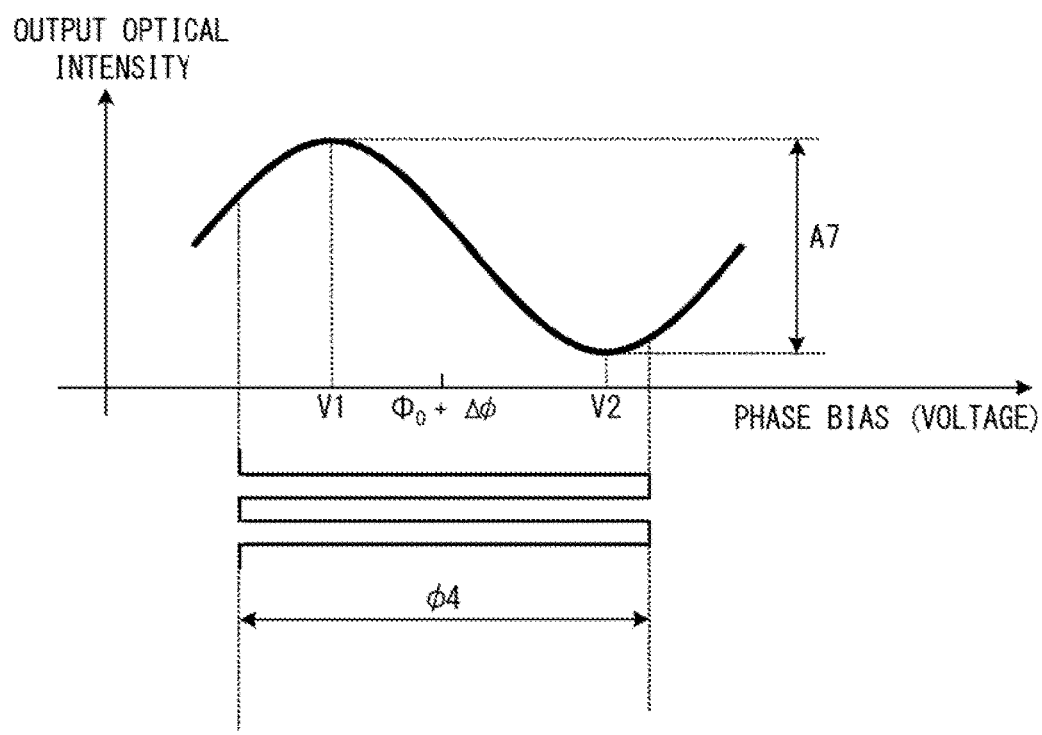

In FIGS. 16A and 16B, the phase bias of the Mach-Zehnder modulator 10 is not appropriately adjusted. Thus, $\Phi_0+\Delta\phi$ is offset from a target value (in this example, π/2), as depicted in FIG. 16A. Meanwhile, the amplitude of the frequency components of the low-frequency signal detected by the AC component detector 14 is A7, as depicted in FIG. 16B.

In a case where the amplitude φ4 of the low-frequency signal is greater than π, even when $\Phi_0+\Delta\phi$ is offset from π/2, the voltage V1 at which the maximum light intensity is attained and the voltage V2 at which the minimum light intensity is attached fall within the voltage range of the low-frequency signal. Thus, when the amplitude φ4 of the low-frequency signal is greater than 9, irrespective of whether $\Phi_0+\Delta\phi$ matches $\pi/2$, the amplitude of the frequency components of the low-frequency signal detected by the AC component detector 14 is substantially constant. In the examples depicted in FIGS. 15A-16B, A6-A7 is obtained. Accordingly, in a case where the amplitude of the low-frequency signal is greater than $\pi$, it will be difficult to optimize the phase bias according to the amplitude of the frequency components of the low-frequency signal detected by the AC component detector 14. Alternatively, the sensitivity in adjustment for optimizing the phase bias according to the amplitude of the frequency components of the low-frequency signal detected by the AC component detector 14 is lower in a case where the amplitude of the low-frequency signal is greater than $\pi$ than in a case where the amplitude of the low-frequency signal is $\pi$. In other words, setting the amplitude of the low-frequency signal to R will increase the sensitivity in adjustment of the phase bias voltage.

Variations

Figure 17:
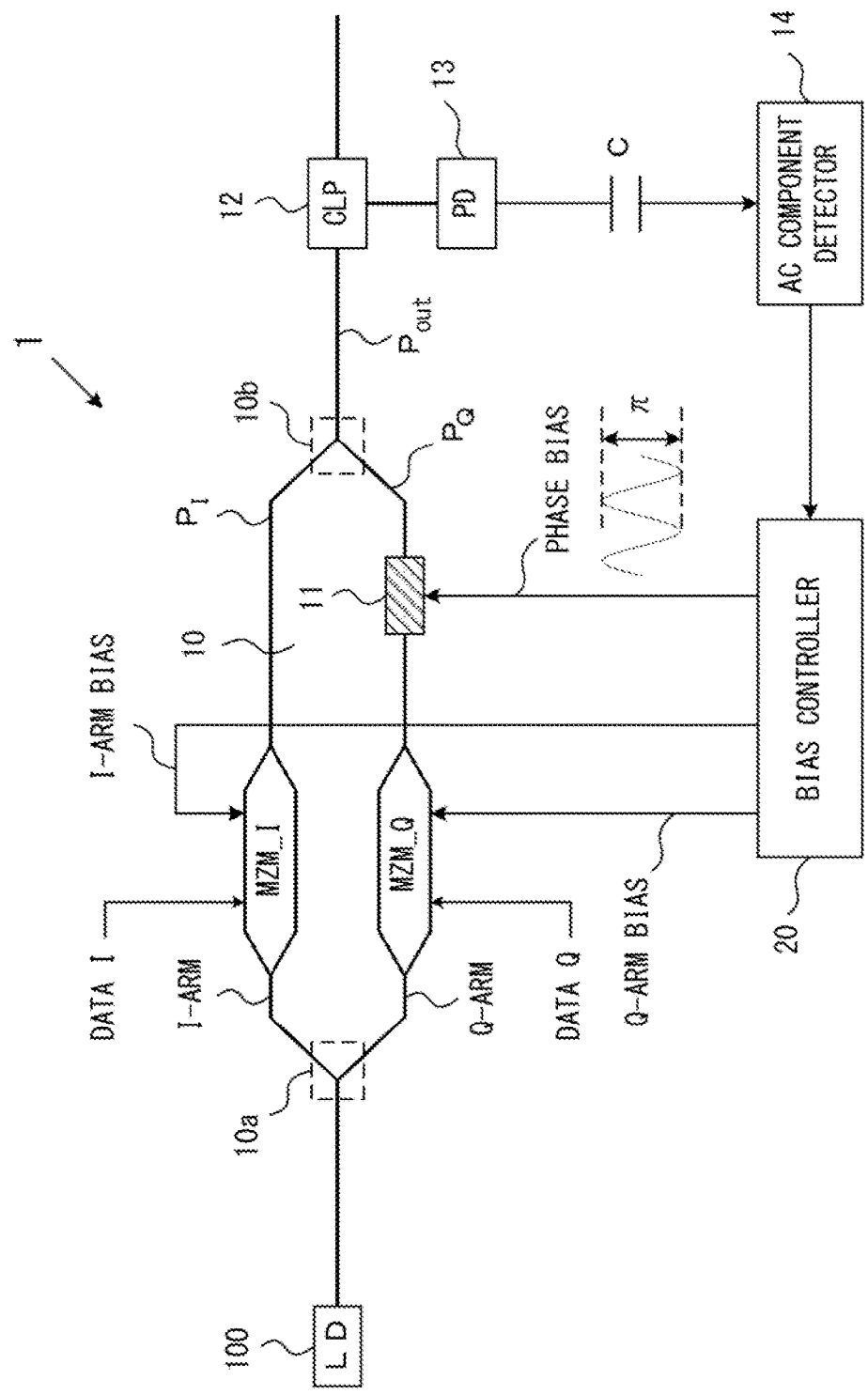
FIG. 17 illustrates a variation of the configuration of an optical modulator.

In the example depicted in FIG. 17, a capacitor C is provided between the photodetector (PD) 13 and the AC component detector 14. The capacitor C removes DC components from an output signal of the photodetector 13. Accordingly, the AC component detector 14 can easily extract the AC components included in output light of the Mach-Zehnder modulator 10 (i.e., the frequency components of the low-frequency signal).

Figure 18:
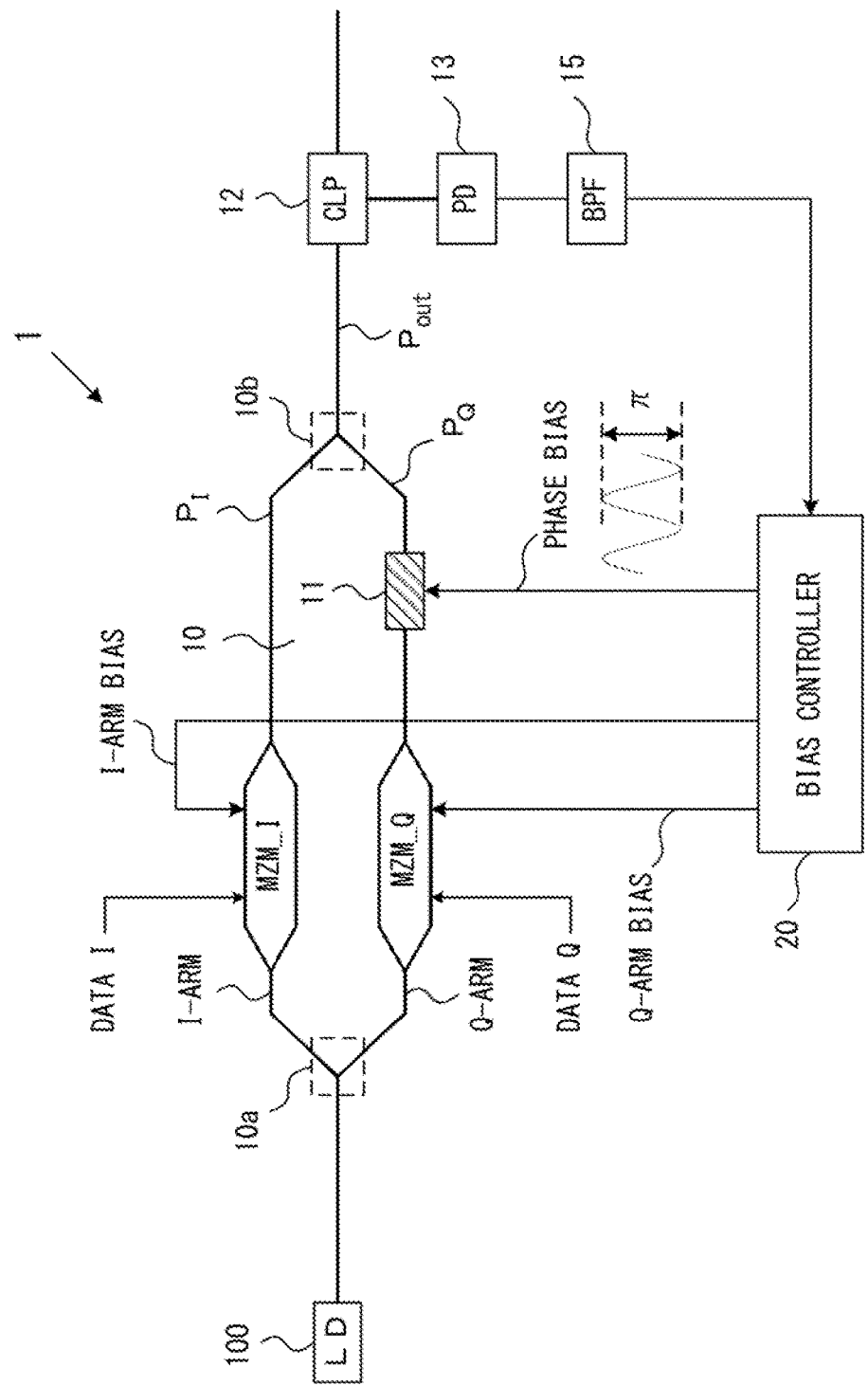
FIG. 18 illustrates another variation of the configuration of an optical modulator.

In the example depicted in FIG. 18, a bandpass filter (BPF) 15 is provided on the output side of the photodetector (PD) 13. The center frequency of the passband of the BPF 15 is substantially the same as the frequency of a low-frequency signal superimposed on a phase bias signal. Thus, when the cycle of the low-frequency signal is T, the center frequency of the passband of the BPF 15 is 1/T.

The phase difference $\Delta\phi$ is changed when adjusting the I/Q-arm bias. Hence, $\Phi_0+\Delta\phi$ could be zero or $\pi$ when adjusting the I/Q-arm bias. When $\Phi_0+\Delta\phi$ is zero or $\pi$, the output light of the Mach-Zehnder modulator 10 includes AC components having a frequency that is twice that of the low-frequency signal. Thus, the BPF 15 preferably has a passband that includes one frequency that is equal to the frequency of the low-frequency signal and another frequency that is twice the one frequency. When the passband of the BPF 15 is narrow, after the phase bias is adjusted, the I/Q bias and the phase bias may be adjusted again.

The bias control depicted in FIGS. 9-12 may be performed when making initial settings for the optical modulator 1. Alternatively, the bias control may be performed when restarting the optical modulator 1. After this, the optical modulator 1 may dynamically or adaptively adjust the operation point of the Mach-Zehnder interferometer MZM_I, the operation point of the Mach-Zehnder interferometer MZM_Q, and the phase-shift amount of the phase shifter 11.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical modulator comprising:
a Mach-Zehnder modulator; and
a processor configured to control a bias of the Mach-Zehnder modulator, wherein
the Mach-Zehnder modulator includes
an input optical circuit that branches and guides input light to a first optical path and a second optical path,
a first Mach-Zehnder interferometer that is formed on the first optical path,
a second Mach-Zehnder interferometer that is formed on the second optical path,
a phase shifter that adjusts a phase difference between the first optical path and the second optical path, and
an output optical circuit that combines output light of the first Mach-Zehnder interferometer and output light of the second Mach-Zehnder interferometer to output an optical signal,
the processor outputs a first bias signal for controlling an operation point of the first Mach-Zehnder interferometer, a second bias signal for controlling an operation point of the second Mach-Zehnder interferometer, and a third bias signal for controlling a phase-shift amount of the phase shifter, a low-frequency signal being superimposed on the third bias signal, and
the processor controls the first bias signal and the second bias signal in such a manner as to reduce a frequency component of the low-frequency signal that is included in the optical signal.

2. The optical modulator according to claim 1, wherein
the processor controls the first bias signal in such a manner as to minimize the frequency component of the low-frequency signal included in the optical signal and then controls the second bias signal in such a manner as to minimize the frequency component of the low-frequency signal included in the optical signal.

3. The optical modulator according to claim 1, wherein
after controlling the first bias signal and the second bias signal, the processor controls the third bias signal in such a manner as to increase the frequency component of the low-frequency signal included in the optical signal.

4. The optical modulator according to claim 3, wherein
the processor controls the third bias signal in such a manner as to maximize the frequency component of the low-frequency signal included in the optical signal.

5. The optical modulator according to claim 1, wherein
an intensity of output light of the Mach-Zehnder modulator changes on a specified cycle with respect to a voltage of the third bias signal, and
an amplitude of the low-frequency signal is set to ½ of a voltage corresponding to the cycle.

6. The optical modulator according to claim 5, wherein
while changing the voltage of the third bias signal, the processor obtains a first voltage value at which the intensity of the output light of the Mach-Zehnder modulator is maximized and a second voltage value at which the intensity of the output light of the Mach-Zehnder modulator is minimized, and
a difference between the first voltage value and the second voltage value is set as the amplitude of the low-frequency signal.

7. A method for controlling a Mach-Zehnder modulator including an input optical circuit that branches and guides input light to a first optical path and a second optical path, a first Mach-Zehnder interferometer that is formed on the first optical path, a second Mach-Zehnder interferometer that is formed on the second optical path, a phase shifter that adjusts a phase difference between the first optical path and the second optical path, and an output optical circuit that combines output light of the first Mach-Zehnder interferometer and output light of the second Mach-Zehnder interferometer to output an optical signal, the method comprising:

monitoring a frequency component of a low-frequency signal included in the optical signal while applying, to the phase shifter, a phase bias signal on which the low-frequency signal has been superimposed;

controlling a first bias signal for controlling an operation point of the first Mach-Zehnder interferometer in such a manner as to minimize the frequency component of the low-frequency signal included in the optical signal;

after the controlling of the first bias signal is ended, controlling a second bias signal for controlling an operation point of the second Mach-Zehnder interferometer in such a manner as to minimize the frequency component of the low-frequency signal included in the optical signal; and after the controlling of the second bias signal is ended, controlling the phase bias signal in such a manner as to maximize the frequency component of the low-frequency signal included in the optical signal.

* * * * *